(12) United States Patent
Mahmood et al.

(10) Patent No.: US 12,475,883 B2
(45) Date of Patent: Nov. 18, 2025

(54) MULTI-ASSISTANT NATURAL LANGUAGE INPUT PROCESSING

(71) Applicant: Amazon Technologies, Inc., Seattle, WA (US)

(72) Inventors: Munir Mahmood, Bellevue, WA (US); Leopold Bushkin, Renton, WA (US); Alexander Thomas Loeb, Lynnwood, WA (US); Michael Schwartz, Seattle, WA (US); Mohammed Arif, Bellevue, WA (US); Rongzhou Shen, Bothell, WA (US); Vikram Kumar Gundeti, Bellevue, WA (US); Shemyla Anwar, Bothell, WA (US); Yaser Khan, Kirkland, WA (US); Edward Page Foyle, Seattle, WA (US); Bo Li, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 18/182,762

(22) Filed: Mar. 13, 2023

(65) Prior Publication Data

US 2023/0282206 A1 Sep. 7, 2023

Related U.S. Application Data

(63) Continuation of application No. 17/387,157, filed on Jul. 28, 2021, now Pat. No. 11,636,851, which is a continuation of application No. 16/580,643, filed on Sep. 24, 2019, now Pat. No. 11,120,790.

(51) Int. Cl.
| | |
|---|---|
| G10L 15/18 | (2013.01) |
| G10L 13/00 | (2006.01) |
| G10L 15/22 | (2006.01) |
| G10L 15/30 | (2013.01) |

(52) U.S. Cl.
CPC .......... *G10L 15/1815* (2013.01); *G10L 13/00* (2013.01); *G10L 15/22* (2013.01); *G10L 15/30* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 6,292,830 B1 * | 9/2001 | Taylor | .................... | G06N 5/043 |
| | | | | 709/224 |
| 9,495,129 B2 * | 11/2016 | Fleizach | ................. | G06F 3/167 |
| 9,875,235 B1 * | 1/2018 | Das | ....................... | G06F 40/205 |
| 9,966,065 B2 * | 5/2018 | Gruber | .................... | G10L 15/28 |
| 10,043,516 B2 * | 8/2018 | Saddler | ................... | G06F 3/165 |
| 10,089,072 B2 * | 10/2018 | Piersol | .................... | G10L 25/84 |
| 10,170,123 B2 * | 1/2019 | Orr | ..................... | H04L 12/2816 |
| 10,255,265 B2 * | 4/2019 | Das | ....................... | G06F 40/205 |

(Continued)

Primary Examiner — Marcus T Riley
(74) Attorney, Agent, or Firm — Pierce Atwood LLP

(57) ABSTRACT

Techniques for a natural language processing (NLP) system to implement more than one assistant are described. The NLP system may receive a natural language input corresponding to more than one user command. The NLP system may respond to a first command, of the natural language input, using a TTS voice of a first NLP system assistant. The NLP system may respond to a second command, of the natural language input, using a TTS voice of a second NLP system assistant.

14 Claims, 29 Drawing Sheets

(56) References Cited

U.S. PATENT DOCUMENTS

| | | | |
|---|---|---|---|
| 10,332,523 B2* | 6/2019 | Leong | G10L 15/30 |
| 10,374,816 B1* | 8/2019 | Leblang | H04L 12/1822 |
| 10,388,272 B1* | 8/2019 | Thomson | G10L 15/22 |
| 10,402,501 B2* | 9/2019 | Wang | G10L 15/22 |
| 10,497,365 B2* | 12/2019 | Gruber | G10L 15/28 |
| 10,536,286 B1* | 1/2020 | Leblang | H04M 3/563 |
| 10,536,287 B1* | 1/2020 | Leblang | G10L 15/22 |
| 10,536,288 B1* | 1/2020 | Leblang | H04M 3/563 |
| 10,573,312 B1* | 2/2020 | Thomson | G10L 15/22 |
| 10,789,041 B2* | 9/2020 | Kim | G06F 3/165 |
| 10,854,188 B2* | 12/2020 | Nygaard | G06F 16/951 |
| 10,957,329 B1* | 3/2021 | Liu | G10L 15/16 |
| 10,971,153 B2* | 4/2021 | Thomson | G10L 15/30 |
| 11,120,790 B2* | 9/2021 | Mahmood | G10L 15/1815 |
| 11,188,376 B1* | 11/2021 | Alexander | G06F 9/45558 |
| 11,393,477 B2* | 7/2022 | Mahmood | G10L 15/22 |
| 11,423,451 B1* | 8/2022 | Chaudhari | G06F 16/638 |
| 12,094,463 B1* | 9/2024 | Mars | G10L 15/08 |
| 2017/0046124 A1* | 2/2017 | Nostrant | G10L 21/00 |
| 2018/0090143 A1* | 3/2018 | Saddler | G10L 13/02 |
| 2018/0144748 A1* | 5/2018 | Leong | G10L 15/30 |
| 2018/0314689 A1* | 11/2018 | Wang | G10L 15/1822 |
| 2018/0341644 A1* | 11/2018 | Retkowski | G06F 40/40 |
| 2019/0206411 A1* | 7/2019 | Li | H04L 12/282 |
| 2020/0167630 A1* | 5/2020 | Cronin | G06F 40/35 |
| 2020/0175961 A1* | 6/2020 | Thomson | G10L 15/28 |
| 2020/0175987 A1* | 6/2020 | Thomson | G10L 15/26 |
| 2021/0090555 A1* | 3/2021 | Mahmood | G10L 13/033 |
| 2021/0090572 A1* | 3/2021 | Mahmood | G06F 3/167 |
| 2021/0090575 A1* | 3/2021 | Mahmood | G10L 17/10 |
| 2021/0398525 A1* | 12/2021 | Mahmood | G10L 15/22 |
| 2023/0282206 A1* | 9/2023 | Mahmood | G10L 15/1815 704/257 |

* cited by examiner

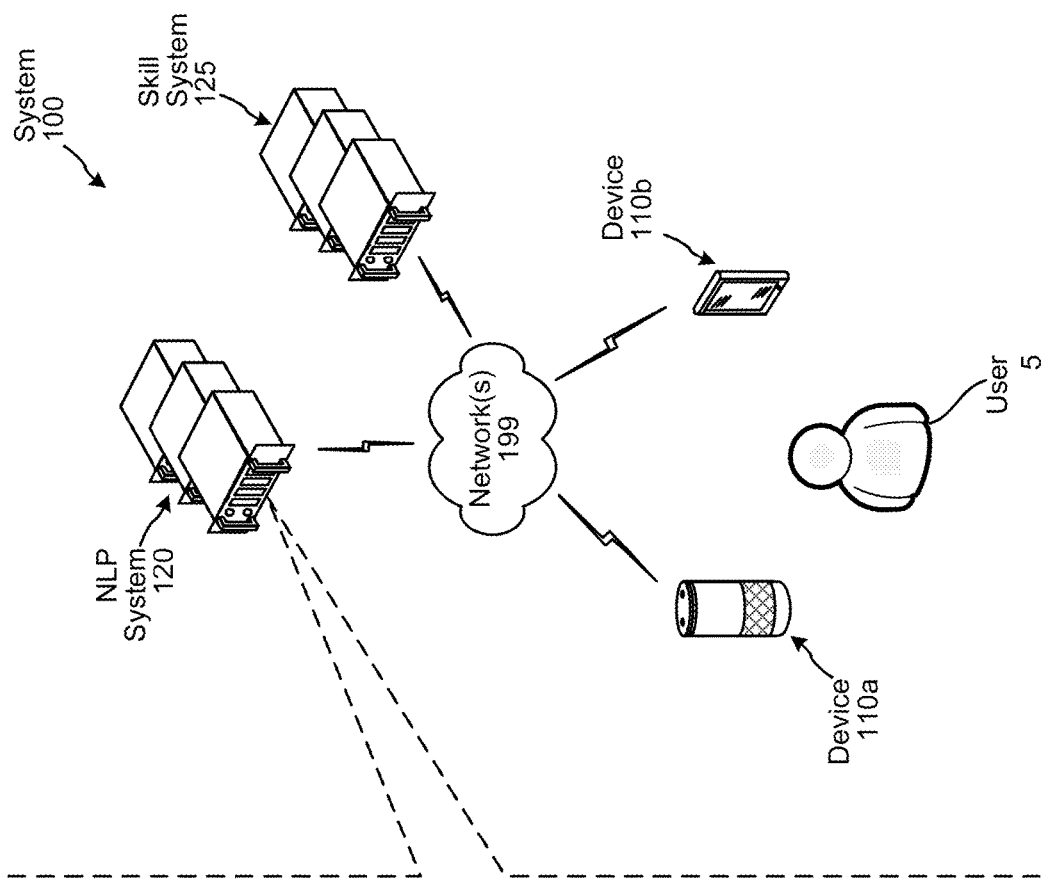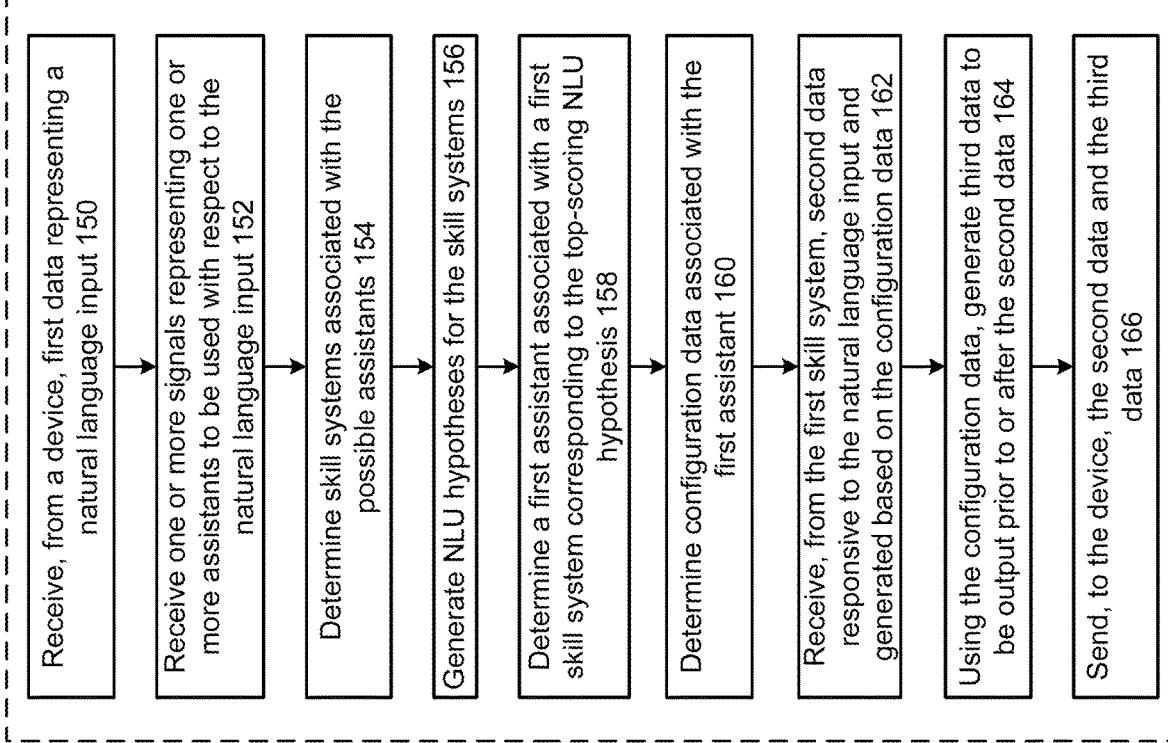

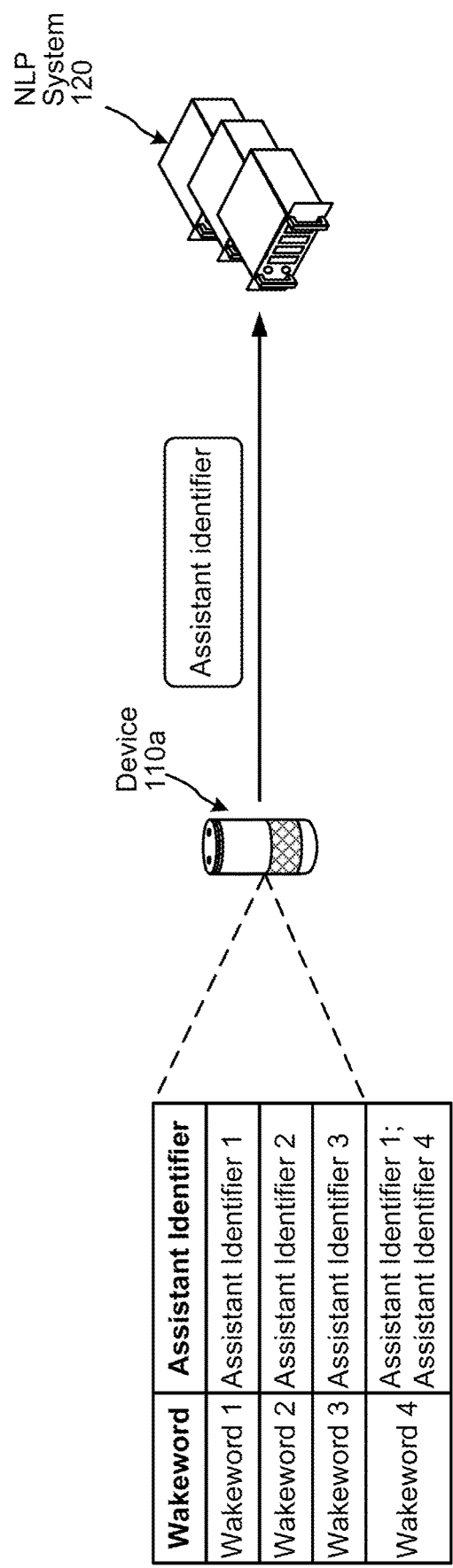

FIG. 4

| Assistant Identifier | Assistant identifier 1 | Assistant identifier 2 | Assistant identifier 3 | Assistant identifier 3 |
|---|---|---|---|---|
| Natural Language Name | Assistant 1 name 1; assistant 2 name 2 | Assistant 2 name | Assistant 3 name | Assistant 4 name |
| TTS Pronunciation of Name | SSML string 1 | SSML string 2 | SSML string 3 | SSML string 4 |
| TTS Voice Model Identifier | TTS voice model identifier 1 | TTS voice model identifier 2 | TTS voice model identifier 3 | TTS voice model identifier 4 |
| Wakeword | Wakeword 1 | Wakeword 2, wakeword 3 | --- | Wakeword 1, wakeword 4 |
| Trigger | Wakeword, natural language input, device type, user identifier | Wakeword, device type | Device type, wake event | Wakeword |
| Skill System | Skill system 1 identifier, skill system 2 identifier, skill system 3 identifier | Skill system 4 identifier | Skill system 1 identifier, skill system 5 identifier | Skill system 1 identifier |

Assistant Configuration Storage 275

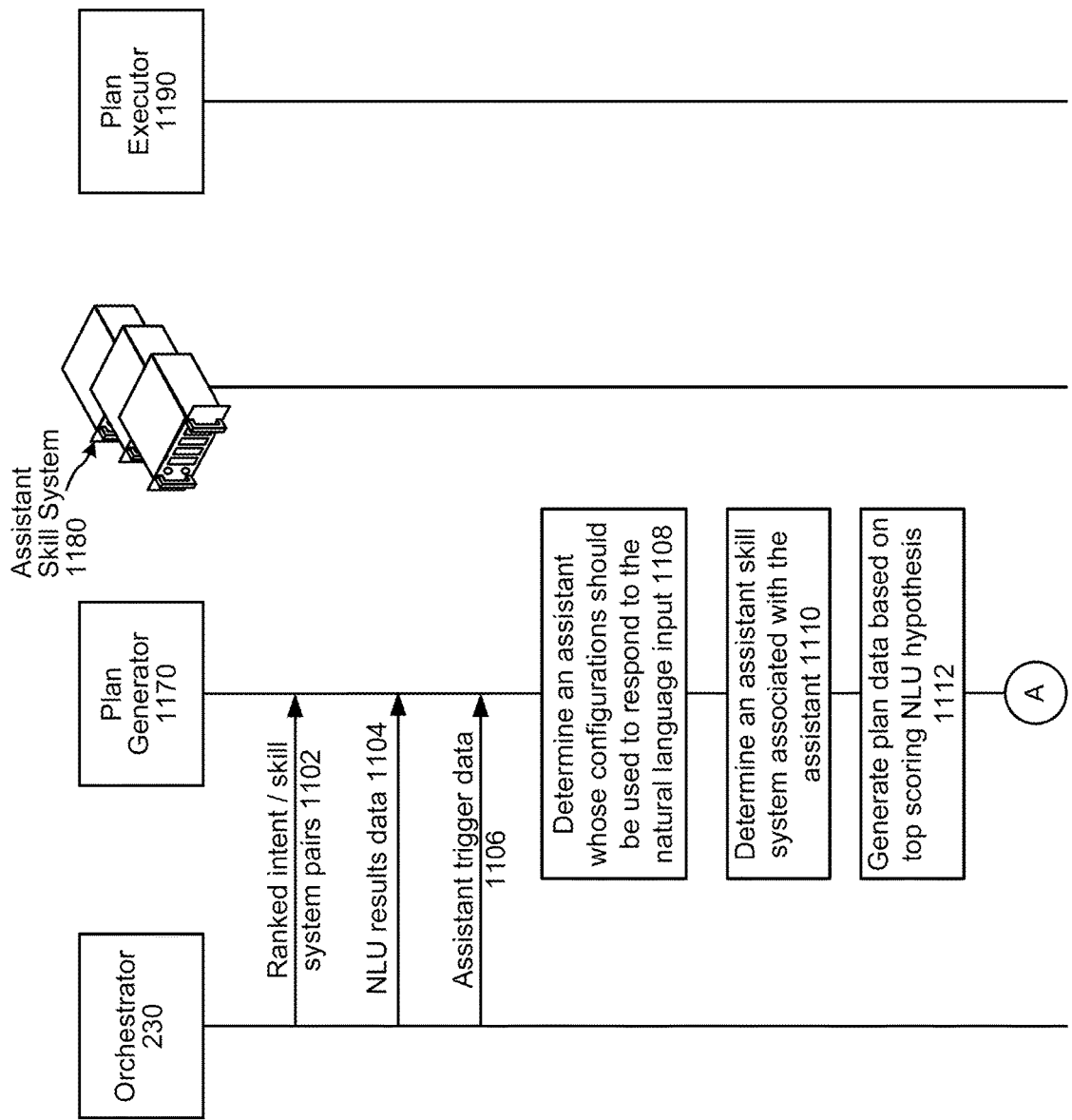

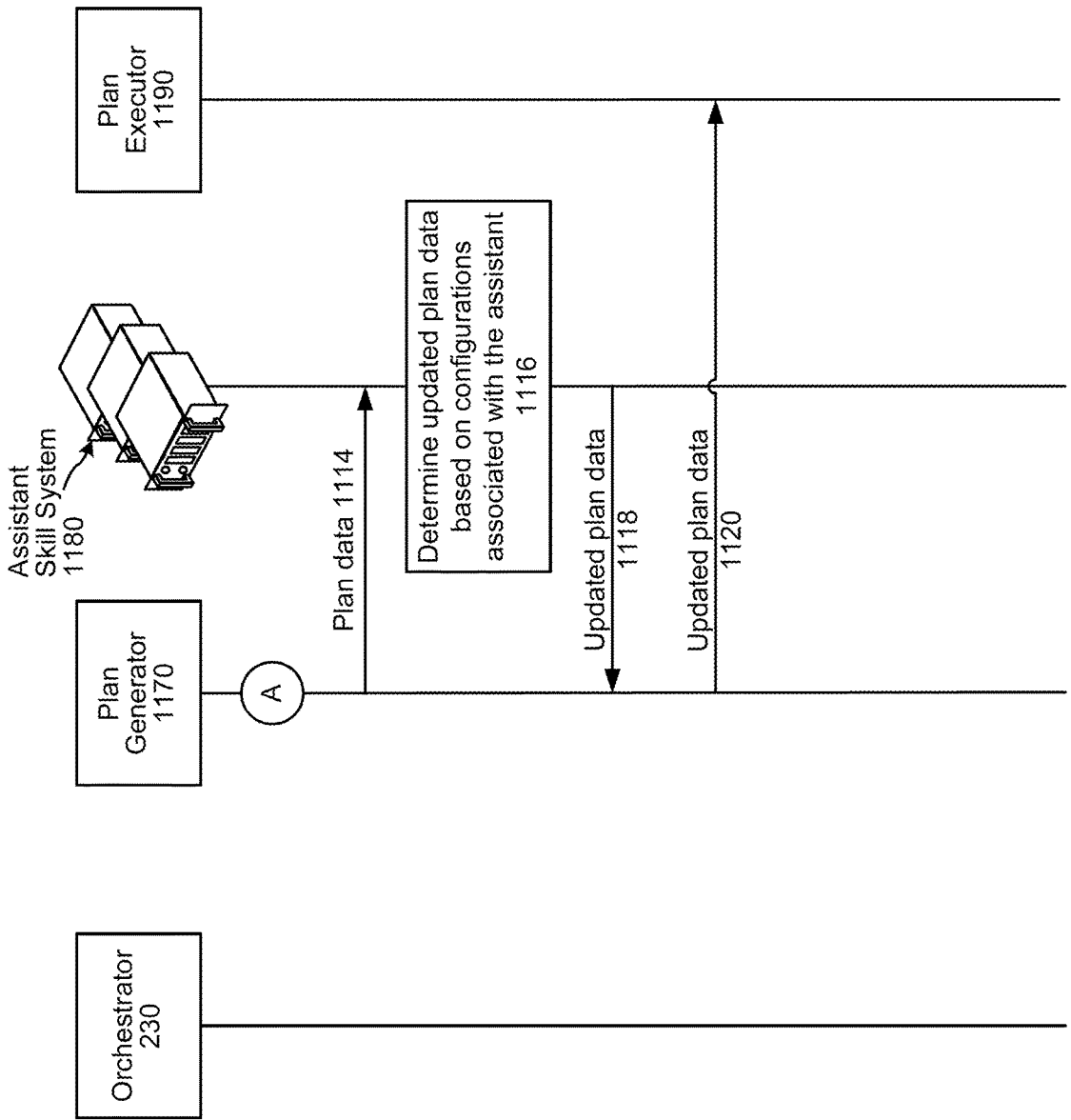

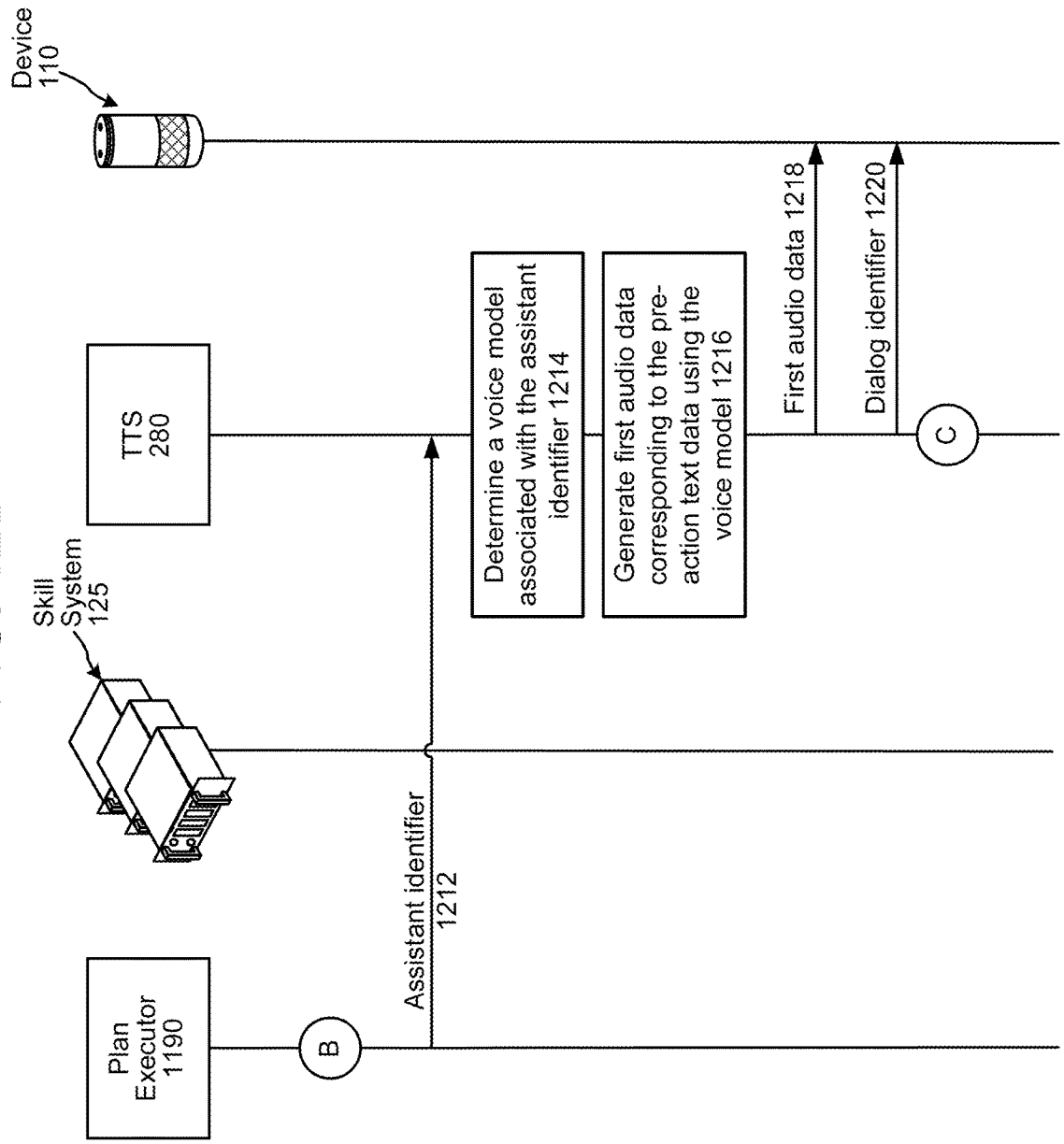

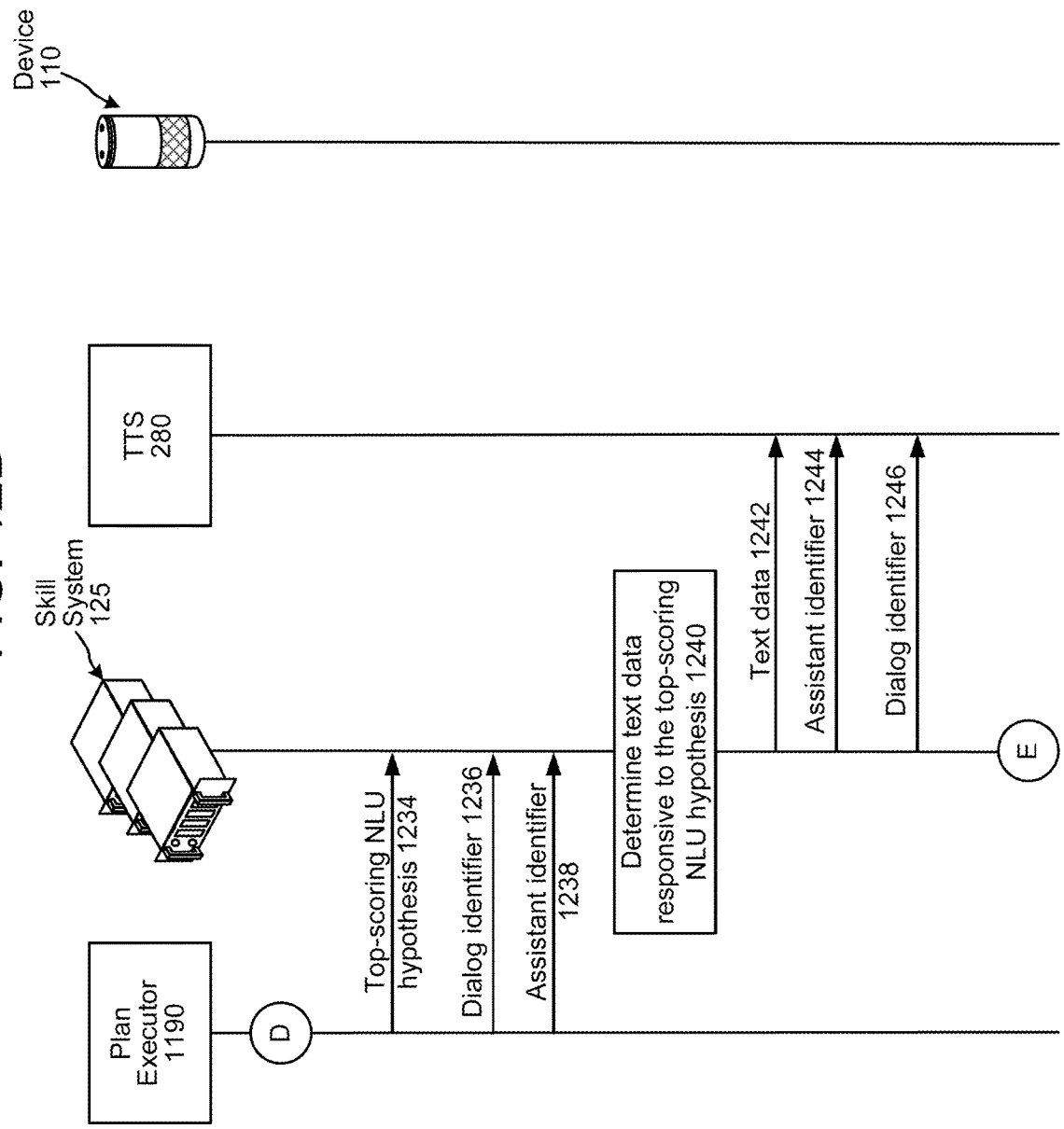

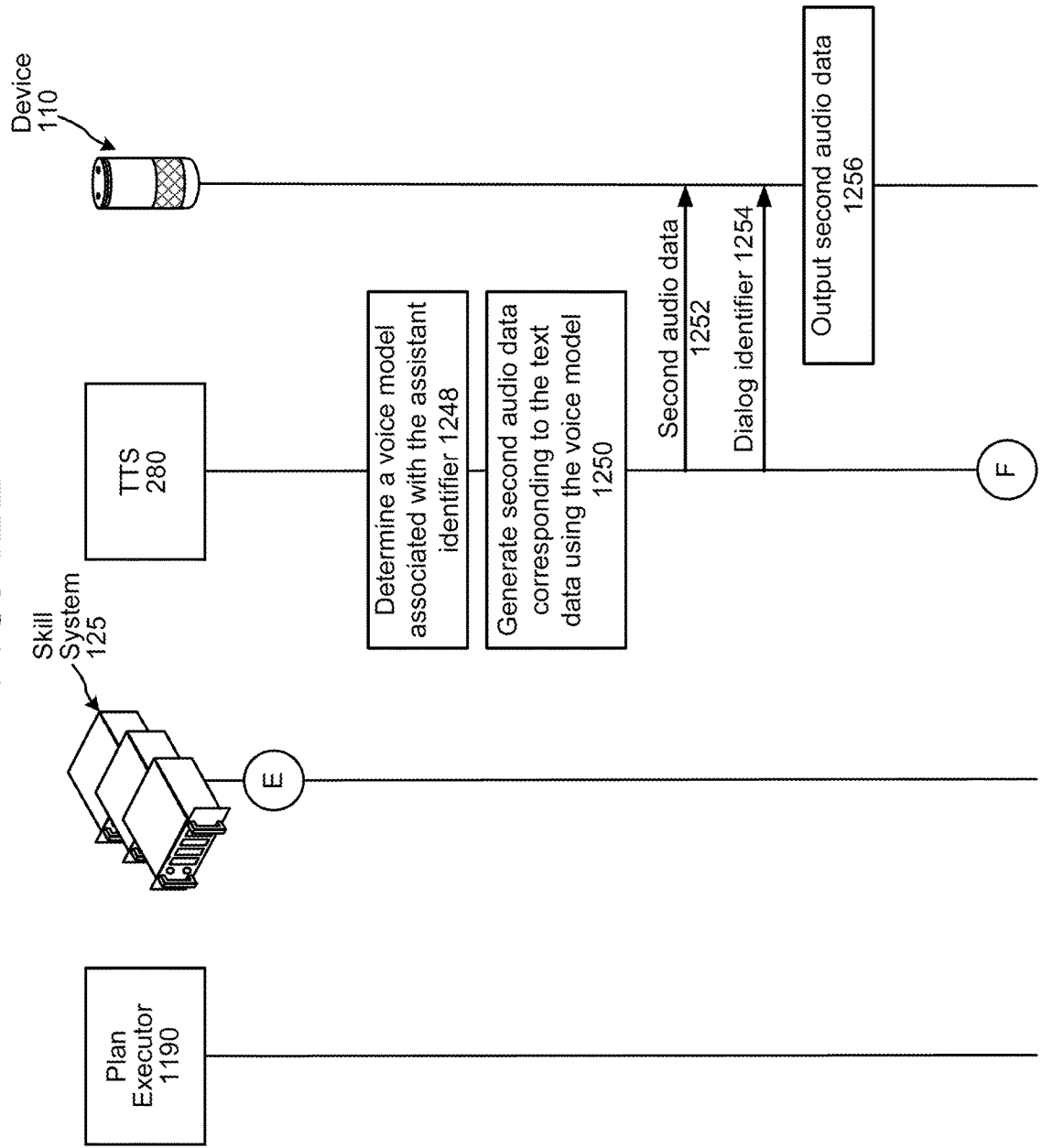

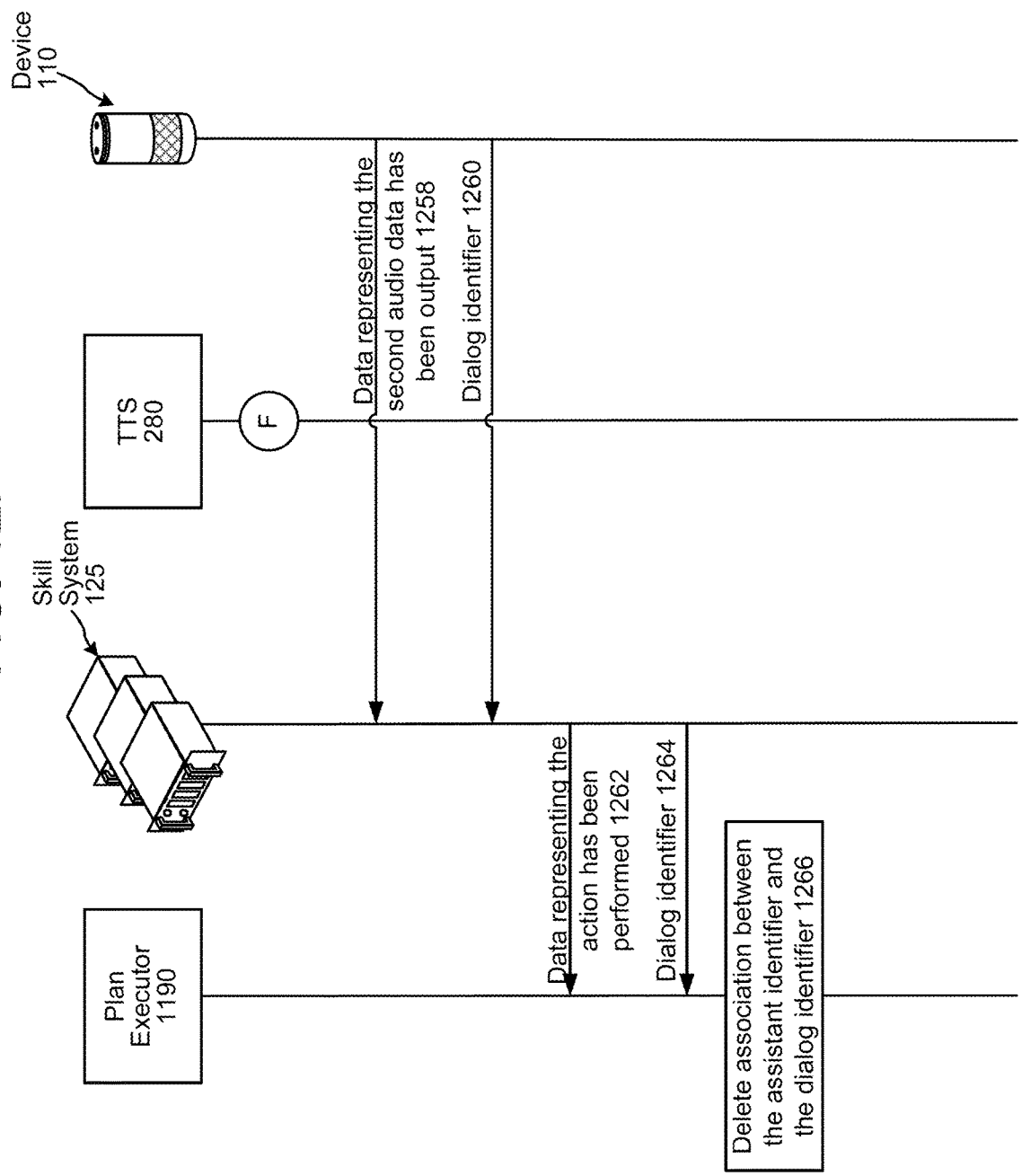

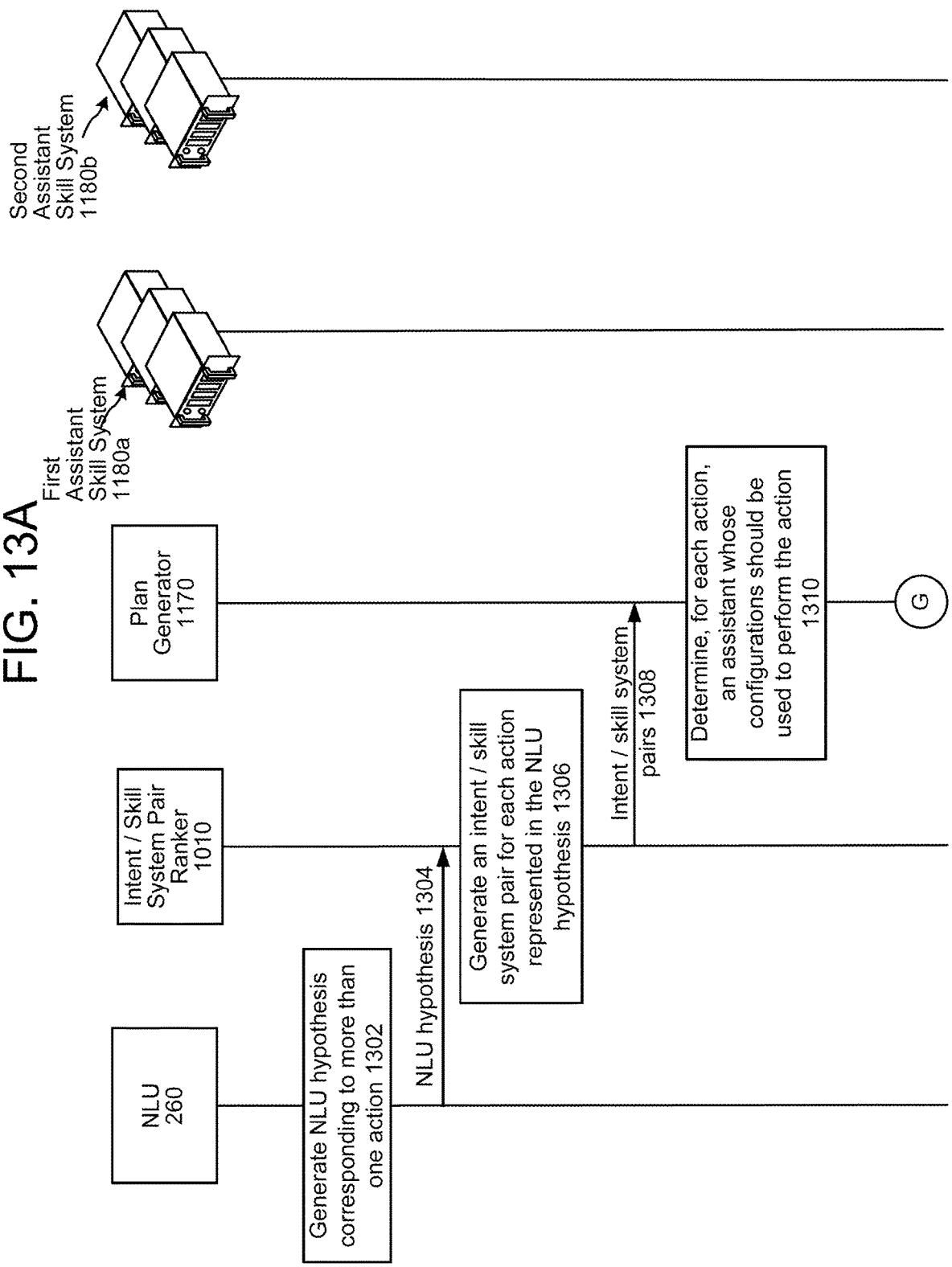

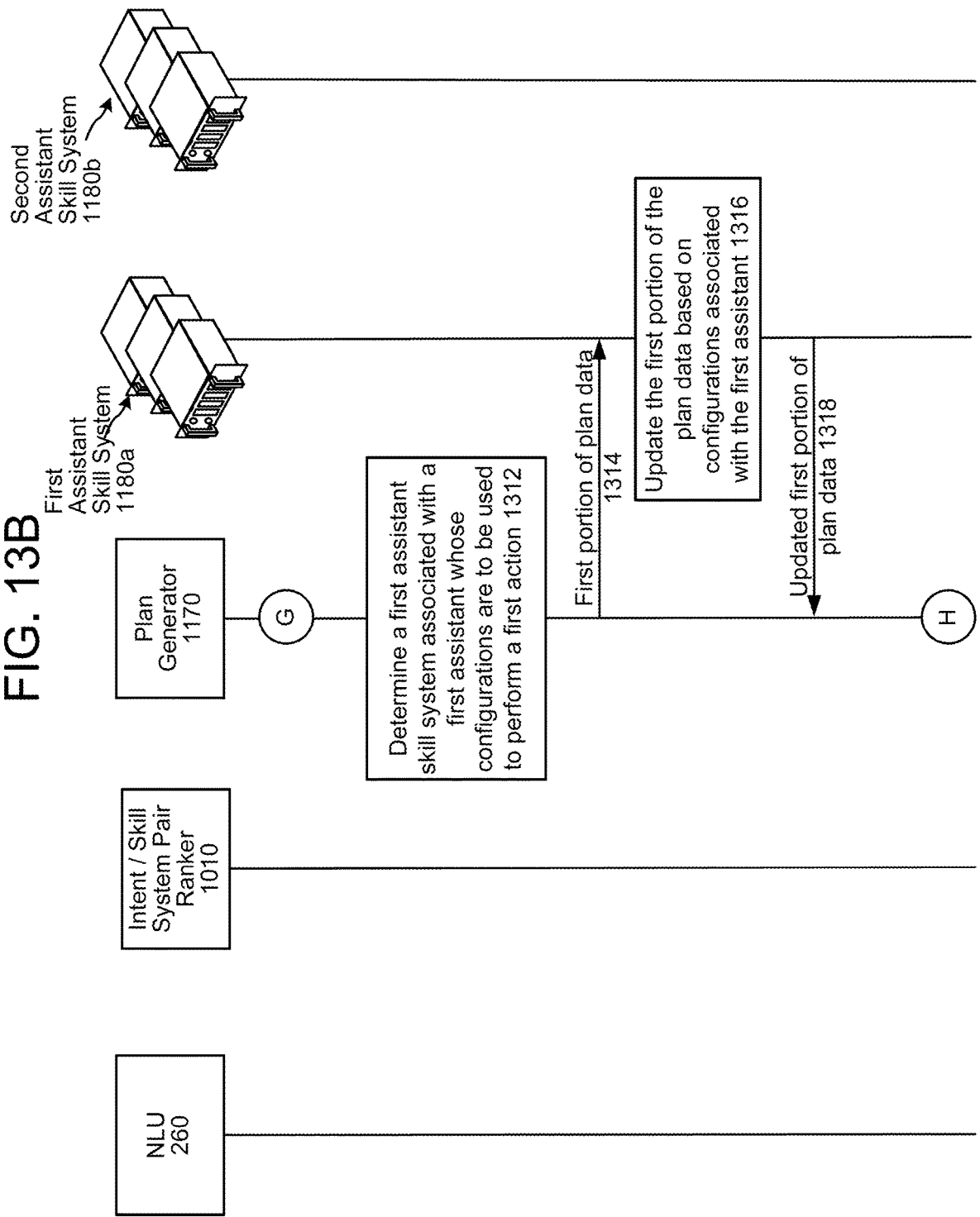

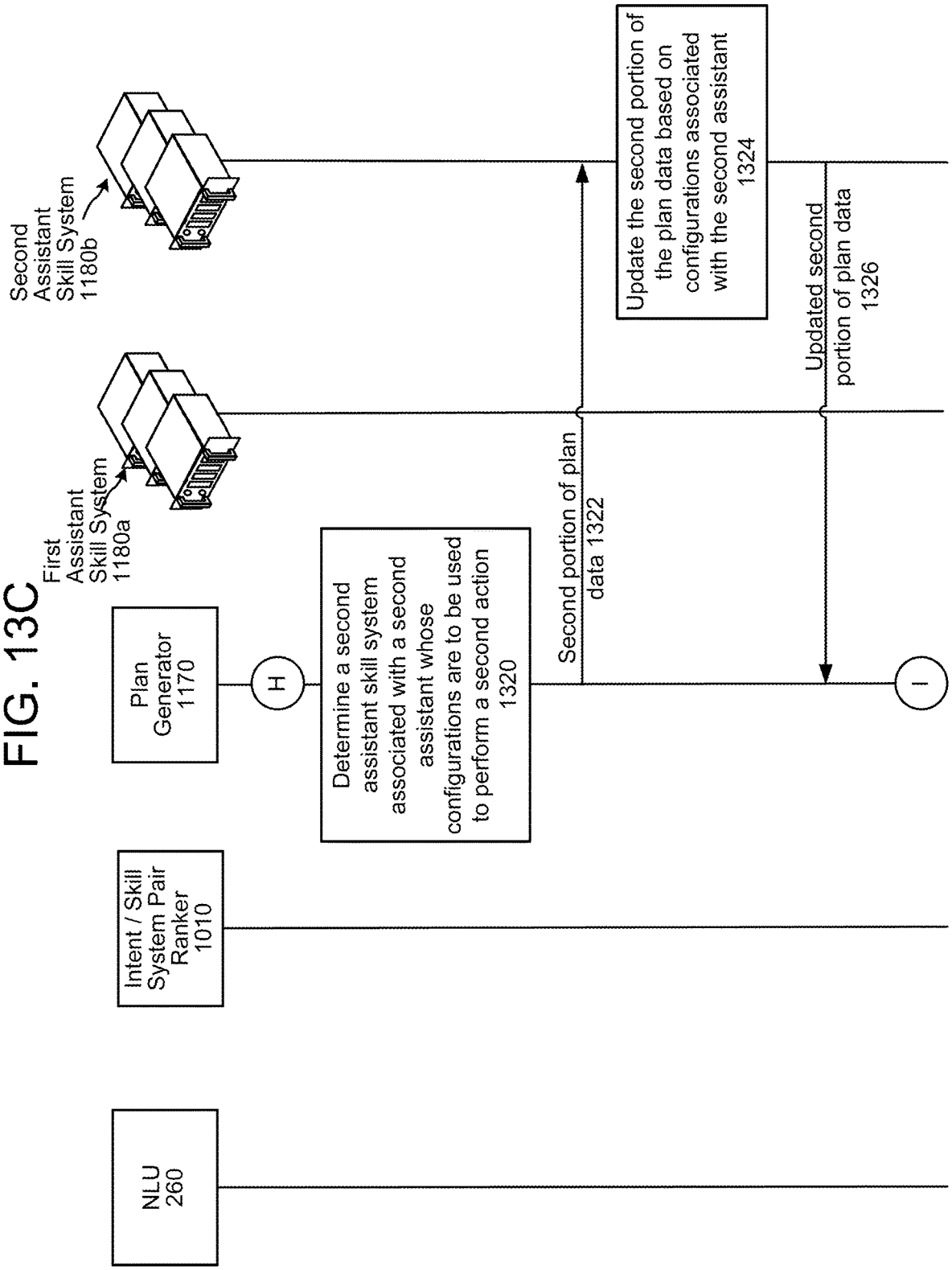

MULTI-ASSISTANT NATURAL LANGUAGE INPUT PROCESSING

CROSS-REFERENCE TO RELATED APPLICATION

This application is a continuation of, and claims the benefit of priority of, U.S. Non-Provisional patent application Ser. No. 17/387,157, filed Jul. 28, 2021, and entitled "MULTI-ASSISTANT NATURAL LANGUAGE INPUT PROCESSING," which is a continuation of, and claims the benefit of priority of, U.S. Non-Provisional patent application Ser. No. 16/580,643, filed Sep. 24, 2019, and entitled "MULTI-ASSISTANT NATURAL LANGUAGE INPUT PROCESSING," issued as U.S. Pat. No. 11,120,790. The contents of each of which are expressly incorporated herein by reference in their entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system configured to respond to a natural language input using a first assistant of a plurality of assistants, in accordance with embodiments of the present disclosure.

FIG. 3 is a conceptual diagram illustrating how a device may detect various wakewords associated with various assistants, in accordance with embodiments of the present disclosure.

FIG. 4 is a conceptual diagram illustrating data that may be stored in an assistant configuration storage, in accordance with embodiments of the present disclosure.

FIGS. 11A through 11B are a signal flow diagram illustrating how updated plan data may be generated based on assistant configurations, in accordance with embodiments of the present disclosure.

FIGS. 12A through 12F are a signal flow diagram illustrating an example of how a natural language input may be responded to based on data transmissions coordinated by a plan executor, in accordance with embodiments of the present disclosure.

FIGS. 13A through 13D are a signal flow diagram illustrating how a natural language input corresponding to more than one action may be processed, in accordance with embodiments of the present disclosure.

DETAILED DESCRIPTION

Figure 2:
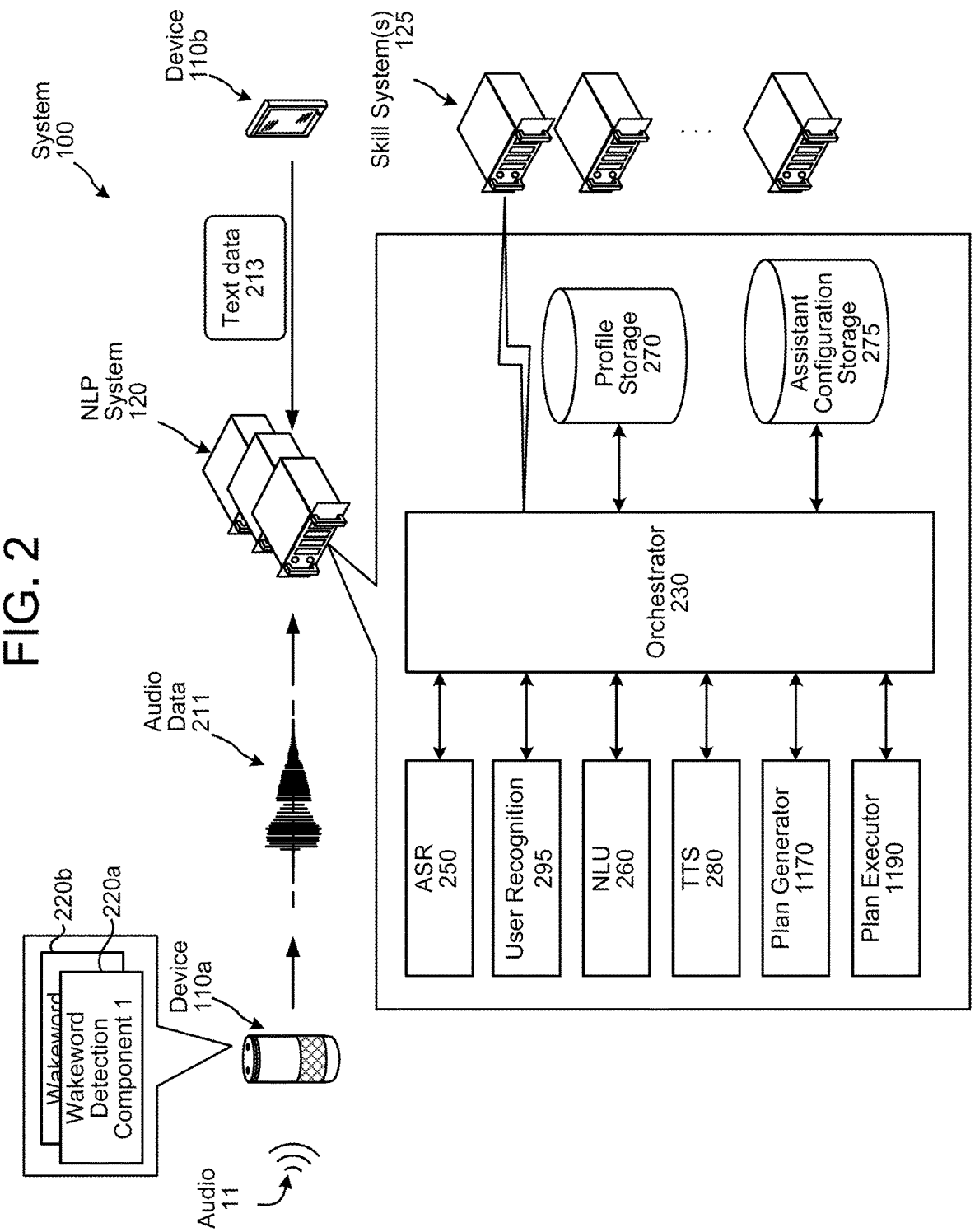
FIG. 2 is a conceptual diagram of components of the system, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech. Natural language processing (NLP) may include ASR, NLU, TTS, and/or other operations involved in the processing of natural language inputs or outputs.

A natural language processing (NLP) system may cause skill systems to perform actions in response to natural language inputs (e.g., spoken inputs and/or typed inputs). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

A NLP system may implement a single assistant. As used herein, an "assistant" may refer to a user-perceived personality of a NLP system. An assistant may be configured to have, for example, a unique voice (e.g., TTS configurations and/or recorded user speech), editorial content (e.g., TTS-generated audio output to a user prior to content provided by a skill system and TTS-generated audio output to a user after content provided by a skill system), skill system capabilities, a "personality" (e.g., programmed to use positive, optimistic, and/or other language that gives the perception of the system to having a distinctive personality), and/or specific access permissions. Example assistants of NLP systems include Alexa, Google Assistant, Siri, and Cortana.

An assistant may include one or more means by which users can invoke and interact with the assistant. For example, an assistant may be invoked via a wakeword, push-to-talk functionality, or some other mechanism.

An assistant may have a personality (e.g., an outward expression that helps users recognize the assistant, including wording and/or sentence structuring of synthesized speech). An assistant's voice (e.g., pitch, tone, accent, and/or other TTS configurations) may be distinctive. The assistant's character (e.g., the moral qualities and/or issues that the assistant has or avoids an opinion), natural language generation, and/or visuals may also be distinctive.

An assistant may be associated with certain capabilities, including but not limited to which skill systems the assistant is associated with (including prioritization algorithm(s) for a particular certain skill system over others), which devices the assistant is associated with, how the assistant may hand-off a user experience to another assistant, etc.

A NLP system that implements a single assistant may provide users with a singular set of TTS voices and editorial content. That is, the NLP system may respond to natural language inputs in the same voice(s) using the same editorial content, across various users of the NLP system and spanning various contexts. For example, different skill systems (e.g., music and weather) that provide different information to the same user, may use the same TTS voice.

The present disclosure provides techniques for an NLP system to implement more than one assistant (e.g., more than one unique set of voices, editorial content, and/or skill system capabilities). For example, one assistant may be associated with TTS configurations that result in TTS-generated audio including a first lexicon and/or first opinion (s), whereas a second assistant may be associated with TTS configurations that result in TTS-generated audio including a second lexicon and/or second opinion(s). Moreover, an assistant may be associated with TTS configurations that result in TTS-generated audio sounding like a specific person (e.g., a specific celebrity). For further example, one assistant may insert a unique fact about a geographic location into a weather report for a requested geographic location. In another example, one assistant may be configured to preface the output of music and the performance of smart home actions (such as locking/unlocking doors and turning lights on/off) with certain editorial content; a second assistant may be configured to preface the output of music with certain editorial content, but not smart home actions; and a third assistant may be configured to preface the performance of smart vehicle actions (e.g., roll windows up and down, alter internal vehicle environment temperature, etc.) with certain editorial content.

Since each assistant may be associated with a unique set of voices, editorial content and/or skill system capabilities, each assistant may be perceived by a user of the NLP system as having a different personality. Such may, among other things, increase user experience with the NLP system.

A system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to respond to a natural language input using a first assistant of a plurality of assistants. Although the figures and discussion of the present disclosure illustrate certain steps in a particular order, the steps described may be performed in a different order (as well as certain steps removed or added) without departing from the present disclosure. As shown in FIG. 1, the system 100 may include one or more devices (110a/110b), local to a user 5, a NLP system 120, and a skill system 125 that communicate across the one or more networks 199. While the user 5 is illustrated as being a human, other types of users (e.g., computing systems) may exist.

The device 110a may receive audio corresponding to a spoken natural language input originating from the user 5. The device 110a may generate audio data corresponding to the audio and may send the audio data to the NLP system 120. Alternatively, the device 110b may receive a typed natural language input from the user 5. The device 110b may generate text data corresponding to the typed input and may send the text data to the NLP system 120.

The device 110 may send the audio data and/or the text data to the NLP system 120 via an application that is installed on the device 110 and associated with the NLP system 120. An example of such an application is the Amazon Alexa application that may be installed on a smart phone, tablet, or the like.

The NLP system 120 may receive (150) first data representing the natural language input. The first data may be audio data or text data sent from the device 110a or 110b, respectively.

The NLP system 120 may receive (152) one or more signals representing one or more assistants to be used with respect to the natural language input. One example signal is an "on-going task" signal represent an assistant that was used to respond to a previous related natural language input. Another example signal is a name of an assistant that was used to wake the device 110a (as described herein below if further detail) to provide the natural language input to the device 110a. A further example signal is a name of an assistant represented in the natural language input itself (which may be determined as part of ASR and/or NLU processing). Another example signal is a device type representing a type of the device (110a/110b) (as certain device types may be associated with certain assistants). A further example signal is a user identifier representing the user 5 that originated the natural language input (as a user profile, associated with a user's identifier, may represent a preferred assistant to be used to respond to natural language inputs originating from the user).

The NLP system 120 may have a storage including data representing, among other things, assistant names and device types with respect to which assistants are associated. The NLP system 120 may determine, in the storage, assistants associated with the received one or more signals.

The storage may also include data representing one or more skill systems associated with each assistant. The NLP system 120 may determine (154), for each assistant associated with the received one or more signals, one or more skills systems associated therewith.

The NLP system 120 may generate (156) NLU hypotheses for the skill systems. If the first data is text data, the NLP system 120 may perform NLU processing on the received text data to generate the NLU hypotheses. If the first data is audio data, the NLP system 120 may perform ASR processing on the received audio data to generate text data, and may perform NLU processing on the generated text data to generate the NLU hypotheses. Alternatively, if the first data is audio data, the NLP system 120 may perform spoken language understanding (SLU) processing on the received audio data to generate the NLU hypotheses (without first converting the audio data to text data).

Each NLU hypothesis may be associated with a score representing NLU processing's confidence that the NLU hypothesis represents the natural language input. The NLP system 120 may determine a first skill system 125 corresponding to the top-scoring NLU hypothesis, and may determine (158) a first assistant associated with the first skill system 125.

The NLP system 120 may determine (160), for example in the aforementioned storage, configuration data associated with the first assistant. Configuration data may represent, for example, whether and what content the assistant is configured to output prior to outputting content received from a skill system, whether and what content the assistant is configured to output after outputting content received from a skill system, and/or how content received from a skill system is to be output (e.g., should weather information be in Fahrenheit or Celsius, should TTS be performed on text data to produce audio data having a certain lexicon and/or opinion, etc.)

The NLP system 120 may send the top-scoring NLU hypothesis (or a representation thereof) and configuration data (representing how content of a skill system is to be output) to the first skill system 125. Thereafter, the NLP system 120 may receive (162), from the first skill system 125, second data responsive to the natural language input and generated by the first skill system 125 based on received configuration data. For example, if the NLU hypothesis represents weather information is to be output for a particular geographic location and configuration data represents weather information is to be output in Celsius, the second data may include temperature information (in Celsius) for the particular geographic location (even though the first skill system 125 may be defaulted to output temperature information in Fahrenheit).

Using the configuration data, the NLP system 120 may generate (164) third data to be output prior to or after the second data. For example, configuration data associated with the first assistant may indicate particular preface content is to be output prior to weather information being output.

The NLP system 120 may send (166) the second data and third data to the device (110a/110b) for output to the user 5. If the second data and third data are text data, and the device 110a is configured to output data as audio, the NLP system 120 may perform TTS processing on the second data and third data (using TTS configurations associated with the first assistant) to generate audio data representing synthesized speech having characteristics (e.g., lexicon, opinion, etc.) associated with the first assistant. The NLP system 120 may thereafter send the audio data to the device 110a for output to the user 5.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the NLP system 120. As indicated previously, the device 110a may be configured to detect various wakewords, with each wakeword corresponding to a different assistant. In at least some examples, a wakeword may correspond to a name of an assistant. An example wakeword/assistant name is "Alexa."

In at least some examples, with respect to FIG. 3, the device 110a may be configured to detect wakewords associated with different assistants. In at least some examples, the device 110a may implement a single wakeword component 220 configured to detect wakewords associated with different assistants. In at least some other examples, the device 110 may implement more than one wakeword component 220. Each wakeword component 220, in at least some examples, may be configured to detect a different wakeword.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the NLP system 120. The audio data 211 may include data corresponding to the detected wakeword, or the device 110a may remove the portion of the audio corresponding to the detected wakeword prior to sending the audio data 211 to the NLP system 120.

As illustrated in FIG. 3, when the device 110a is configured to detect wakewords associated with different assistants, the device 110a may store a table (or other data structure) associate detectable wakewords with different assistant identifiers. As illustrated in FIG. 3, a wakeword may be associated with one, or more than one, assistant identifiers. When the device 110a detects a wakeword, the device 110a may determine an assistant identifier associated with the wakeword, and may send the assistant identifier to the NLP system 120.

Referring back to FIG. 2, the NLP system 120 may include an orchestrator component 230 configured to receive the audio data 211 (and optionally and assistant identifier) from the device 110a. The orchestrator component 230 may send the audio data 211 to an ASR component 250.

The ASR component 250 transcribes the audio data 211 into ASR results data (e.g., text data) include one or more ASR hypotheses (e.g., in the form of an N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The device 110b may receive a typed natural language input. The device 110b may generate text data 213 representing the typed natural language input. The device 110b may send the text data 213 to the NLP system 120, wherein the text data 213 is received by the orchestrator component 230.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the NLP system 120, a skill system 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent. The NLU component 260 may output NLU results data (which may include tagged text data, indicators of intent, etc.).

As described above, the NLP system 120 may perform speech processing using two different components (e.g., the ASR component 250 and the NLU component 260). One skilled in the art will appreciate that the NLP system 120, in at least some examples, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs a most likely NLU hypothesis, or multiple NLU hypotheses in the form of a lattice or an N-best list with individual NLU hypotheses corresponding to confidence scores or other scores (such as probability scores, etc.).

The NLP system 120 may communicate with one or more skill systems 125. A skill system 125 may be configured to execute with respect to NLU results data. For example, a weather skill system may determine weather information for a geographic location represented in a user profile or corresponding to a location of the device 110 that captured a corresponding natural language input. For further example, a taxi skill system may book a requested ride. In another example, a restaurant skill system may place an order for a pizza. A skill system 125 may operate in conjunction between the NLP system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The NLP system 120 may include a TTS component 280. The TTS component 280 may generate audio data (e.g., synthesized speech) from text data using one or more different methods. Text data input to the TTS component 280 may come from a skill system 125, the orchestrator component 230, or another component of the NLP system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder. The TTS component 280 may use a variety of models and components to produce audio data corresponding to synthesized speech. Different parameters may be used by the TTS component 280 to configure a single model to generate synthesized speech to have different voice characteristics depending on the situation (e.g., which assistant's voice is to be used to output data to the user). The parameters may be settings used by the TTS component 280 and/or may be input to the TTS component 280 (for example as speech synthesis markup language (SSML) data) to inform the TTS processing.

The NLP system 120 may include a user recognition component 295. In at least some examples, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the NLP system 120 in correlation with a natural language input, to stored biometric data of users. The user recognition component 295 may additionally or alternatively perform user recognition by comparing image data (e.g., including a representation of at least a feature of a user), received by the NLP system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the NLP system 120 and/or other systems.

The NLP system 120 may include profile storage 270. The profile storage 270 may include a variety of information related to individual users, groups of users, devices, etc. that interact with the NLP system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the NLP system 120 with permission to allow the skill system 125 to execute with respect to the user's natural language inputs. If a user does not enable a skill system 125, the NLP system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile.

For example, a household device's profile may include the user identifiers of users of the household.

The NLP system 120 may include an assistant configuration storage 275. An assistant identifier (representing an assistant) may be associated with various data in the assistant configuration storage 275. As illustrated in FIG. 4, an assistant identifier may be associated with a natural language name representing how a user may speak or type the name of an assistant in a natural language input. An assistant identifier may additionally or alternatively be associated with a speech synthesis markup language (SSML) string representing a TTS pronunciation of the assistant's natural language name. An assistant identifier may additionally or alternatively be associated with a TTS voice model identifier representing a TTS voice model for generating synthesized speech in a voice unique to the assistant (as compared to other assistants implemented by the NLP system 120). As used herein, a "TTS voice model" may refer to TTS parameters (e.g., pitch, tone, dialect, etc.) that represent a particular TTS voice. In at least some examples, a TTS voice model may be generated from recorded speech of a human. In other words, a TTS voice model may represent speech characteristics common to various spoken phrases by a human. In at least some other examples, a TTS voice model may be generated by selecting certain parameters of speech to generate a unique synthesized voice. The foregoing may be contrasted with recordings of a human speech that may be output, by the NLP system 120 and to a user, prior to and/or after TTS generated speech using a voice model.

An assistant identifier may additionally or alternatively be associated with a wakeword that may be used to wake a device to provide a natural language input to be processed using configurations of the assistant. An assistant identifier may additionally or alternatively be associated with one or more triggers that may cause the assistant to be implemented. For example, a wakeword trigger may represent processing may be caused to be performed with respect to an assistant's configurations based on a user speaking the assistant's wakeword. For further example, a natural language input trigger may represent processing may be caused to be performed with respect to an assistant's configurations based on a natural language input including the assistant's natural language name. As another example, a device type trigger may represent processing may be caused to be performed with respect to an assistant's configurations based on the device 110, that captures a natural language input, corresponding to a particular device type. As a further example, a user identifier trigger may representing processing may be caused to be performed with respect to an assistant's configurations based on a user profile (corresponding to a user identifier output by the user recognition component 295 for a natural language input) representing the assistant as a preferred assistant. An assistant identifier may additionally or alternatively be associated with one or more skill system identifiers representing one or more skill system 125 configured to perform actions when a natural language input to be processed using configurations of the assistant.

An assistant identifier may additionally or alternatively be associated with a device identifier (e.g., a device identifier). When an assistant identifier is associated with a device's identifier, the assistant (corresponding to the assistant identifier) may be invoked even if a wakeword, corresponding to a second assistant, is spoken to wake the device, and even if the user that spoke the wakeword has a preferred assistant in the user's profile. Such may enable a business entity (e.g., that places devices in the workplace for employee use) to control which assistant and access permissions (defined by the business entity) are used to respond to natural language inputs provided to those devices. Assistant trigger data, representing an assistant identifier associated with a device identifier of a device that captured a natural language input, may be, in at least some examples, ranked higher than other assistant trigger data used to determine which assistant(s) is to be used to respond to the natural language input.

In at least some examples, a machine learned model may be used to determine which assistant to invoke to respond to a natural language input. For example, assistant trigger data may be input to the machine learned model. The machine learned model may consider the assistant trigger data, along with weights corresponding to different trigger data, to determine which assistant to invoke.

While the present disclosure describes an example of how assistants of a NLP system 120 may be determined using configuration data (e.g., such as that stored in the assistant configuration storage 275), one skilled in the art will appreciate that the present disclosure is not limited thereto. For example, which assistant to invoke with respect to a natural language input may be determined using configuration data, machine learning techniques, heuristics, one or more decision trees, and/or some other mechanism.

Figure 5:
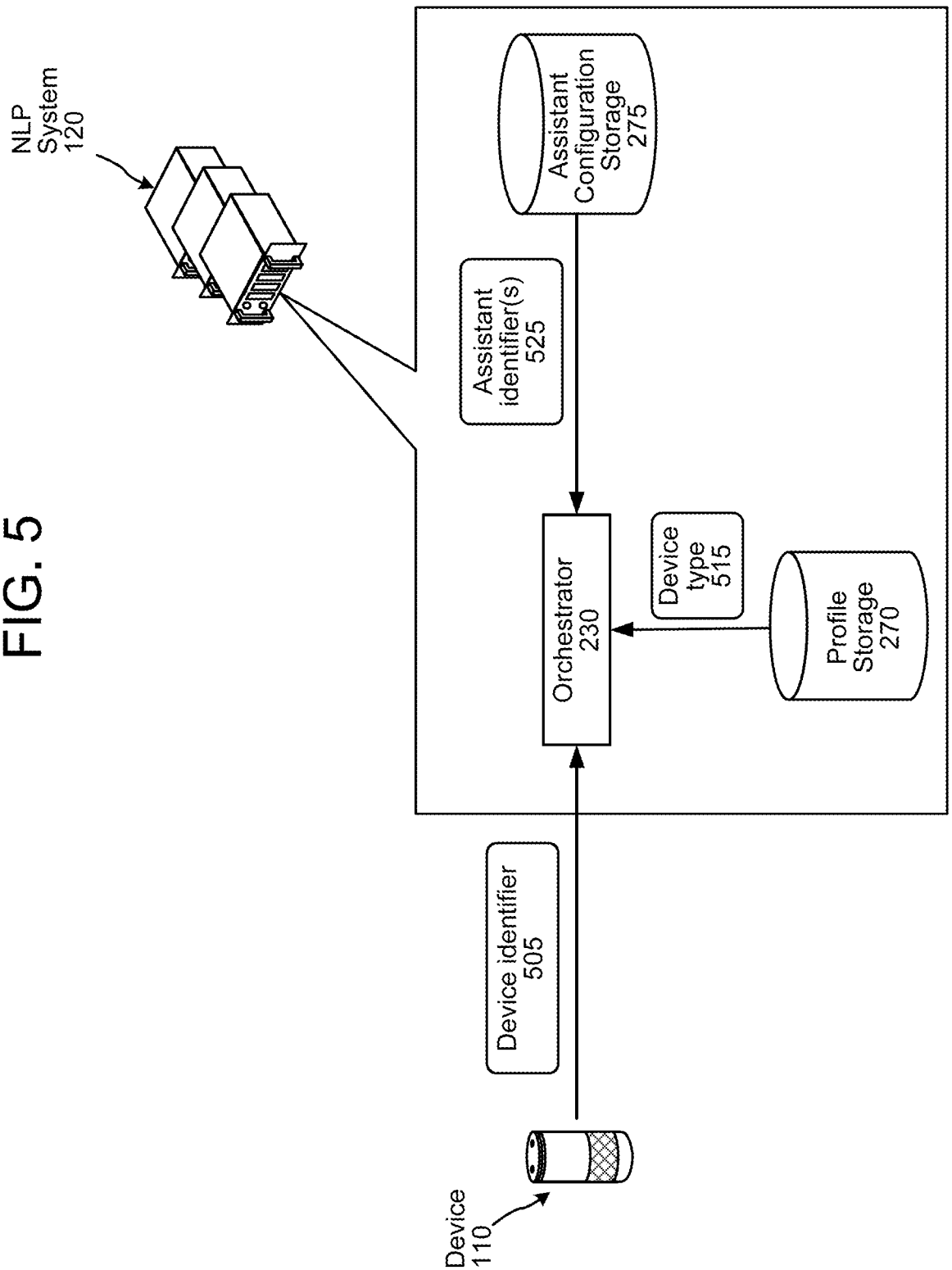
FIG. 5 is a conceptual diagram illustrating how an orchestrator component may determine an assistant to handle a natural language input based on a device type, in accordance with embodiments of the present disclosure.

The orchestrator component 230 may be configured to perform assistant recognition (e.g., determine an assistant whose configurations a user expects to be used to perform an action responsive to a natural language input). As illustrated in FIG. 5, the orchestrator component 230 may determine an assistant based on device type. In addition to receiving audio data or text data (representing a natural language input) from a device 110, the orchestrator component 230 may receive, from the device 110, a device identifier 505 corresponding to the device 110. The orchestrator component 230 may query the profile storage 270 for a device type corresponding to the device identifier 505 (which may be represented in a device profile, user profile, and/or group profile in the profile storage 270). In response, the orchestrator component 230 may receive data representing a device type 515 of the device 110. The orchestrator component 230 may thereafter query the assistant configuration storage 275 for an assistant identifier(s) 525 associated with the device type in the assistant configuration storage 275.

Figure 6:
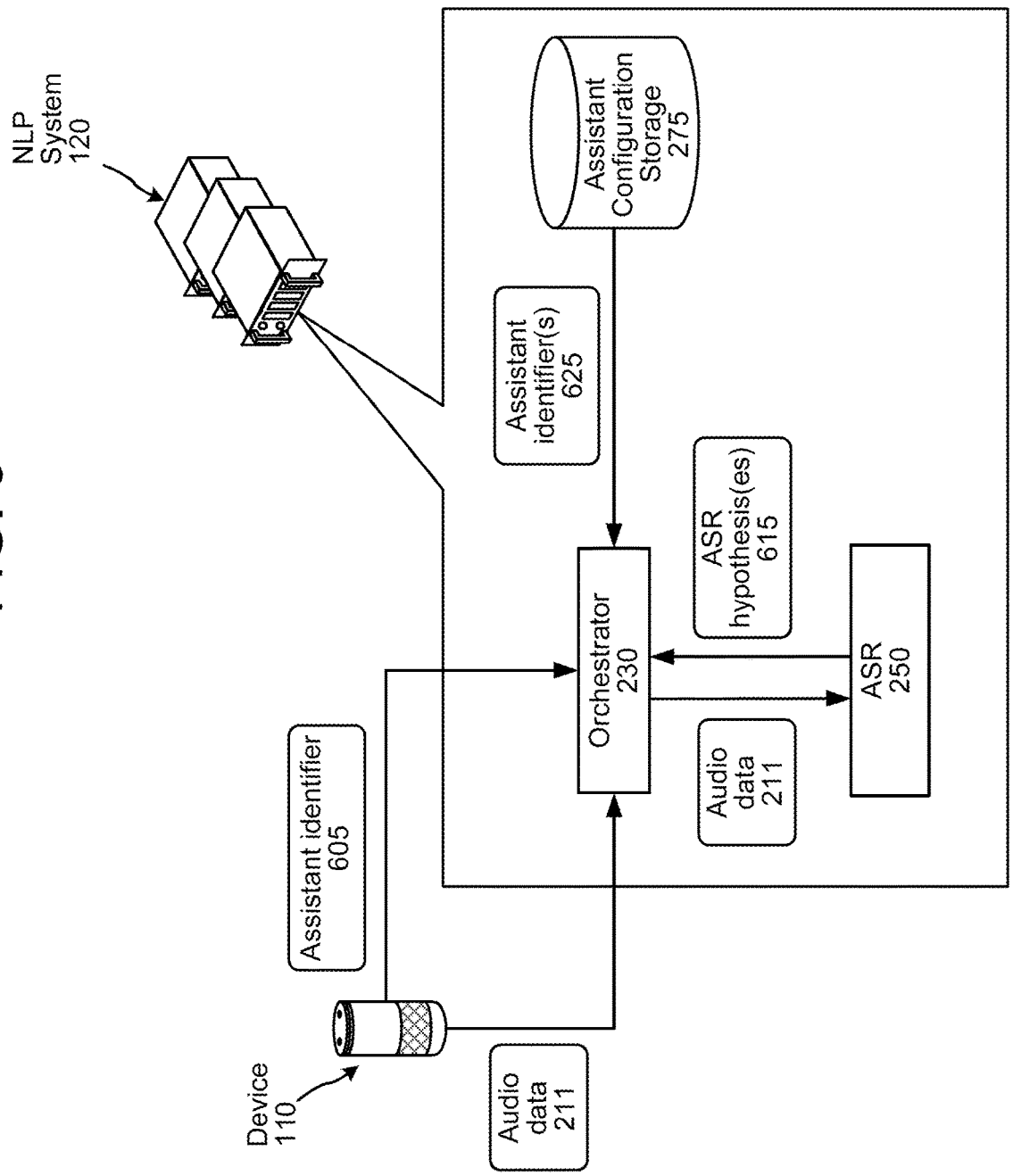
FIG. 6 is a conceptual diagram illustrating how an orchestrator component may determine an assistant based on a wakeword, in accordance with embodiments of the present disclosure.

As illustrated in FIG. 6, the orchestrator component 230 may determine an assistant based on a wakeword used to wake the device 110. As described above with respect to FIG. 3, the device 110 may be configured to detect wakewords associated with different assistants. In such instances, when the device 110 detects a wakeword, the device 110 may determine an assistant identifier 605 associated with the wakeword, and may send the assistant identifier 605 to the orchestrator component 230. In such instances, the orchestrator component 230 may determine the assistant as being the assistant corresponding to the received assistant identifier 605.

One skilled in the art will appreciate that a wakeword is only one way in which a user may wake a device 110 from a sleep mode in order to input a natural language input to the device 110. The orchestrator component 230 may determine an assistant based on non-wakeword wake events. An example of a non-wakeword wake event is a push-to-talk wake event where a user may interact with a button associated with the device 110 for the purpose of waking the device 110 to input (e.g., speak) a natural language input to the device 110. The device 110 may send, to the orchestrator component 230, an indicator representing the wake event (e.g., a push-to-talk event). The orchestrator component 230 may thereafter query the assistant configuration storage 275 for an assistant identifier(s) associated with the wake event indicator.

In some instances, the device 110 may be configured to detect wakewords associated with different assistants, but rather than sending an assistant identifier 605 to the orchestrator component 230, may simply send audio data 211 (including the spoken wakeword) to the orchestrator component 230. The orchestrator component 230 may send the audio data 211 to the ASR component 250 and thereafter receive, from the ASR component 250, one or more ASR hypotheses 615. Since the audio data 211 included the wakeword, the one or more ASR hypotheses 615 may include the wakeword. The orchestrator component 230 may determine a portion of text corresponding to a wakeword in a received ASR hypothesis (or the top-scoring received ASR hypothesis of an N-best list of ASR hypotheses). In at least some examples, the orchestrator component 230 may determine the portion of text corresponding to the wakeword as being the first word of an ASR hypothesis. The orchestrator component 230 may thereafter query the assistant configuration storage 275 for an assistant identifier(s) 625 associated with the determined wakeword in the assistant configuration storage 275.

Figure 7:
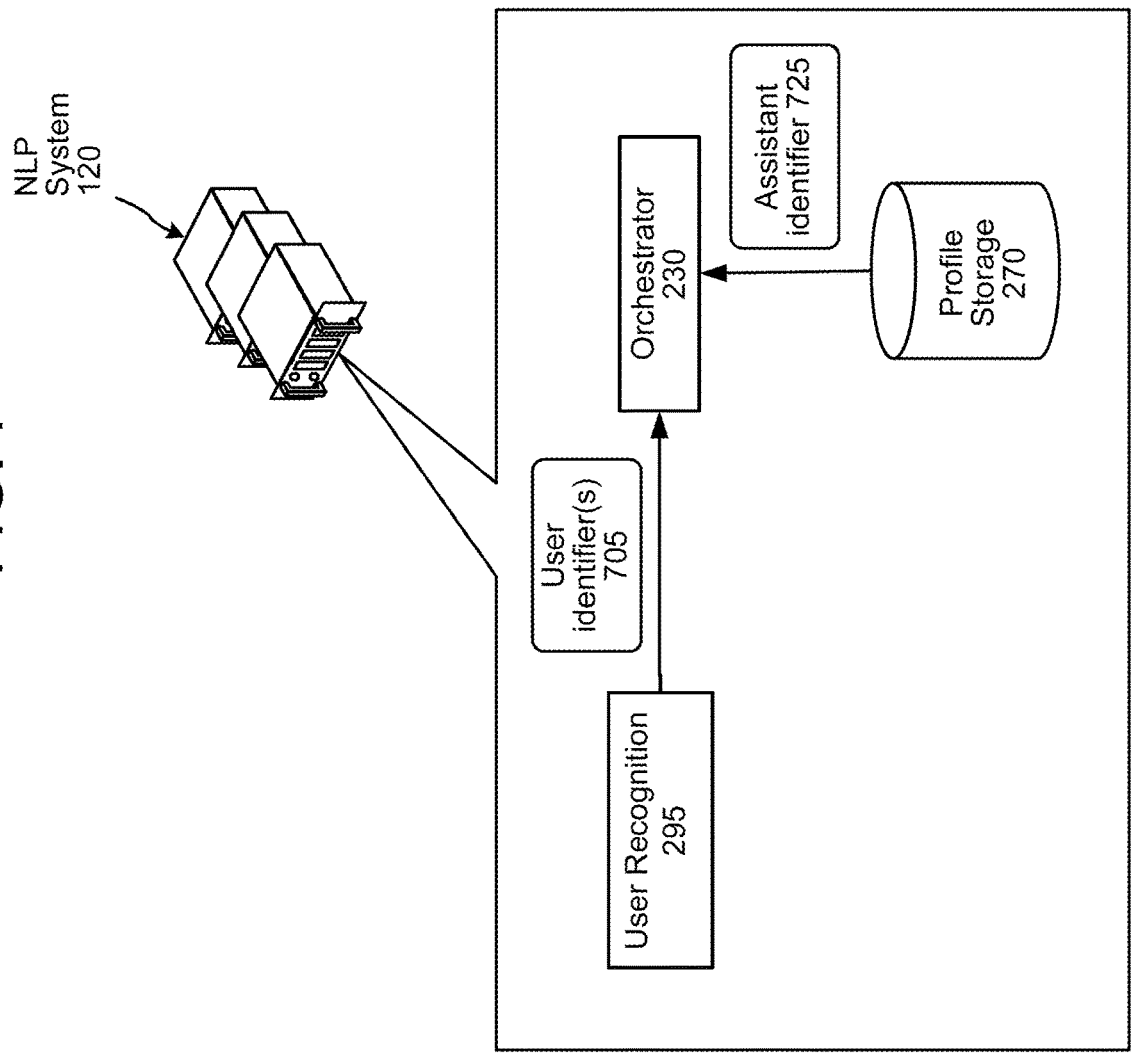
FIG. 7 is conceptual diagram illustrating how an orchestrator component may determine an assistant based on a user identifier, in accordance with embodiments of the present disclosure.

As illustrated in FIG. 7, the orchestrator component 230 may additionally or alternatively determine an assistant based on a user identifier corresponding to a natural language input. After the orchestrator component 230 receives audio data 211 or text data 213 corresponding to a natural language input, the orchestrator component 230 may receive one or more user identifiers 705 from the user recognition component 295. As described above, the one or more user identifiers 705 may correspond to one or more users that the user recognition component 295 determines may have originated the natural language input. As also described above, a user identifier may correspond to a user profile (in the profile storage 270) including data representing a preferred assistant (e.g., one to be used to respond to natural language inputs originating from the user corresponding to the user profile). The orchestrator component 230 may query the profile storage 270 for an assistant identifier 725 represented in a user profile corresponding to a user identifier (or top-scoring user identifier) received from the user recognition component 295.

The orchestrator component 230 may send text data (either the received text data 213 or text data output by ASR processing) to the NLU component 260 along with the assistant identifier(s) (525/625/725) determined by the orchestrator component 230. The NLU component 260 may thereafter load one or more models trained to perform named entity recognition (NER) processing and/or intent classification (IC) processing (as described below) with respect to the assistant(s) corresponding to the assistant identifier(s) (525/625/725) into the NLU component 260.

The orchestrator component 230 may additionally or alternatively determine an assistant based on an assistant identifier being associated with an ongoing but paused action. An assistant identifier may be associated with an action being performed. A user may cause the NLP system 120 to pause the action, for example by inputting another natural language input while the action is being performed. For example, the NLP system 120 may be outputting weather information when the user inputs another natural language input. The NLP system 120 may pause the outputting of the weather information to perform an action responsive to the second natural language input. Thereafter, the user may indicate performance of the first action is to be recommenced. In such instances, the orchestrator component 230 may determine the assistant identifier based on the assistant identifier being associated with the first action when the first action was paused.

Figure 8:
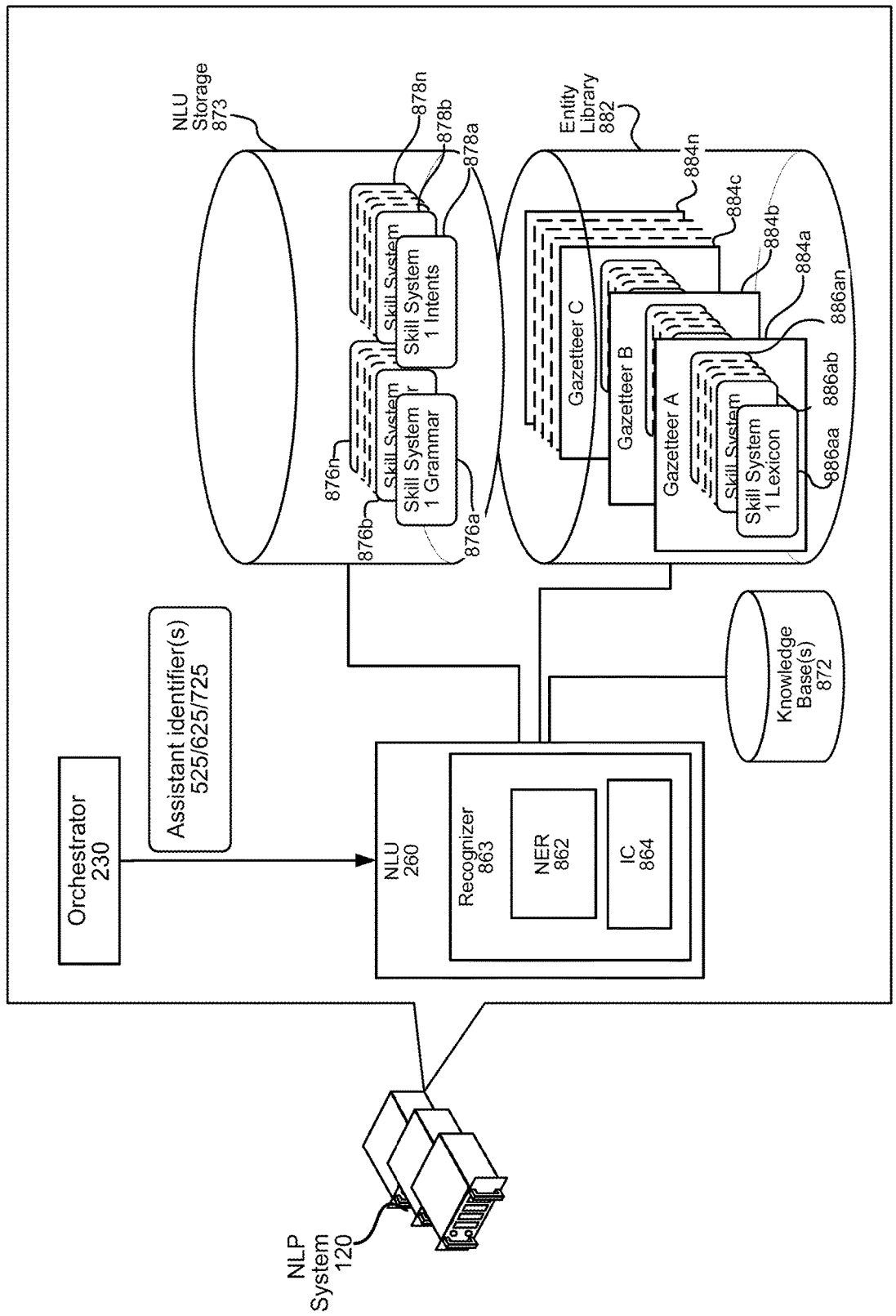
FIG. 8 is a conceptual diagram of how natural language processing is performed, in accordance with embodiments of the present disclosure.
Figure 9:
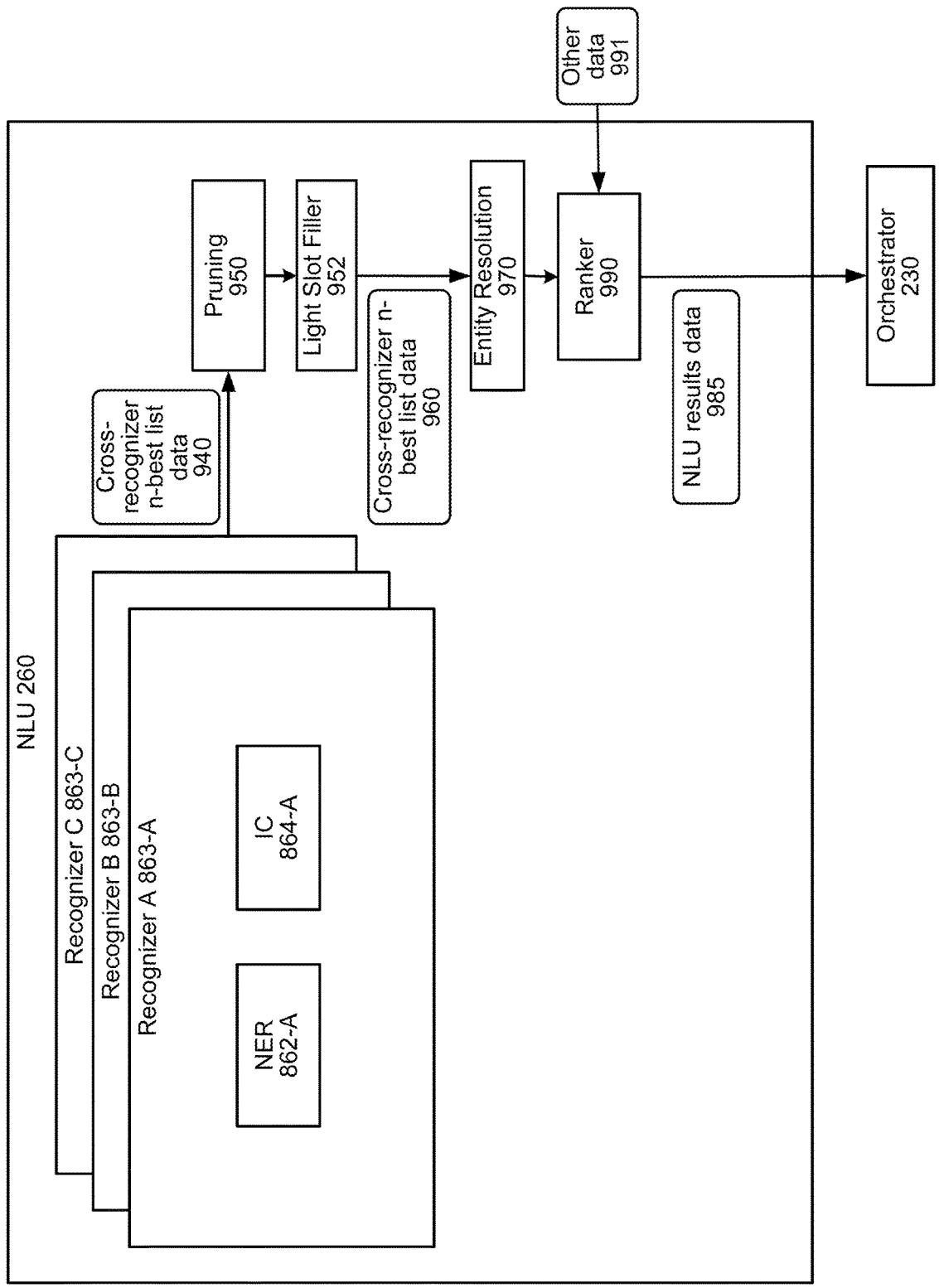
FIG. 9 is a conceptual diagram of how natural language processing is performed, in accordance with embodiments of the present disclosure.
Figure 10:
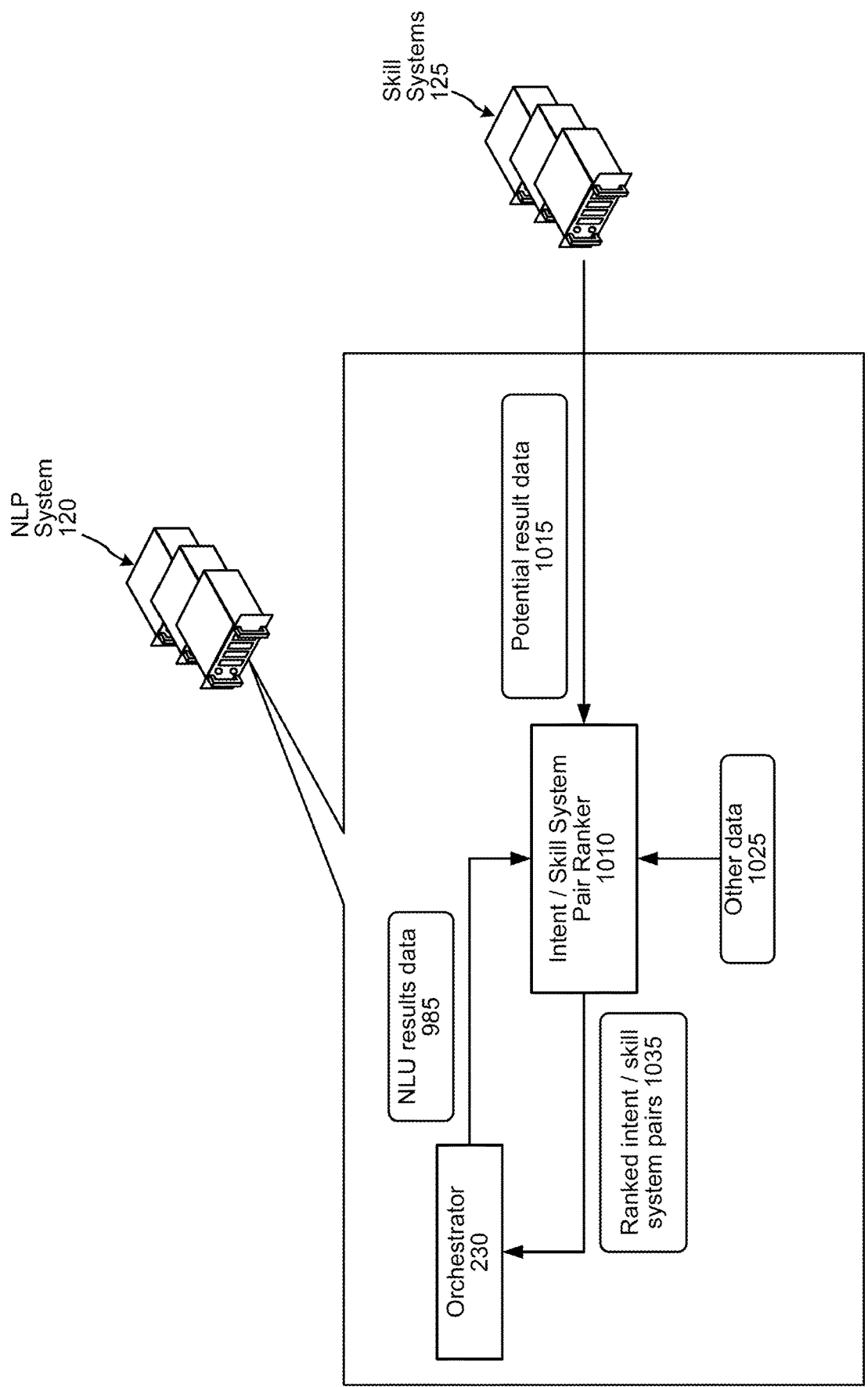
FIG. 10 is a conceptual diagram illustrating example processing of an intent/skill system pair ranker, in accordance with embodiments of the present disclosure.

FIG. 8 illustrates how the NLU component 260 may perform NLU processing. The NLU component 260 may include one or more recognizers 863. In at least some examples, a recognizer 863 may be associated with a skill system 125 (e.g., the recognizer may be configured to interpret text data to correspond to the skill system 125). In at least some other examples, a recognizer 863 may be associated with a domain (e.g., the recognizer may be configured to interpret text data to correspond to the domain). In yet some other examples, a recognizer 863 may be associated with an assistant (e.g., the recognizer may be configured to interpret text data to correspond to one or more skill systems 125 corresponding to the assistant).

Recognizers 863 may process text data in parallel, in series, partially in parallel, etc. For example, a recognizer corresponding to a first domain may process text data at least partially in parallel to a recognizer corresponding to a second domain. For further example, a recognizer corresponding to a domain may process text data at least partially in parallel to a recognizer corresponding to an assistant. In another example, a recognizer corresponding to a first assistant may process text data at least partially in parallel to a recognizer corresponding to a second assistant.

The NLU component 260 may communicate with various storages. The NLU component 260 may communicate with an NLU storage 873, which includes skill system grammars (876a-876n), representing how natural language inputs may be formulated to invoke skill systems 125, and skill system intents (878a-878n), representing intents supported by respective skill systems 125.

Each recognizer 863 may be associated with a particular grammar 876, a particular intent(s) 878, and a particular personalized lexicon 886 (stored in an entity library 882). A gazetteer 884 may include skill system-indexed lexical information associated with a particular user. For example, Gazetteer A (884a) may include skill system-indexed lexical information 886aa to 886an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 863 may include a NER component 862 that attempts to identify grammars and lexical information that may be used to construe meaning with respect to text data input therein. A NER component 862 identifies portions of text data that correspond to a named entity that may be recognizable by the NLP system 120. A NER component 862 may also determine whether a word refers to an entity that is not explicitly mentioned in the text, for example "him," "her," "it" or other anaphora, exophora or the like.

A NER component 862 applies grammar models 876 and lexical information 886 associated with one or more skill systems 125 to determine a mention of one or more entities in text data input therein. In this manner, a NER component 862 identifies "slots" (i.e., particular words in text data) that may be needed for later processing. A NER component 862 may also label each slot with a type (e.g., noun, place, city, artist name, song name, etc.).

Each grammar model 876 may include the names of entities (i.e., nouns) commonly found in speech about a particular skill system 125 to which the grammar model 876 relates, whereas lexical information 886 may be personalized to the user identifier output by the user recognition component 295 for the natural language input. For example, a grammar model 876 associated with a shopping skill system may include a database of words commonly used when people discuss shopping.

A downstream process called named entity resolution actually links a portion of text data (identified by a NER component 862) to a specific entity known to the NLP system 120. To perform named entity resolution, the NLU component 260 may use gazetteer information (884a-884n) stored in the entity library storage 882. The gazetteer information 884 may be used to match text data (identified by a NER component 862) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 863 may also include an IC component 864 processes text data input thereto to determine an intent (s) of a skill system(s) 125 that potentially corresponds to the natural language input represented in the text data. An intent corresponds to an action to be performed that is responsive to the natural language input represented by the text data. An IC component 864 may communicate with a database 878 of words linked to intents. For example, a music intent database may link words and phrases such as "quiet," "volume off," and "mute" to a <Mute> intent. An IC component 864 identifies potential intents by comparing words and phrases in text data to the words and phrases in an intents database 878 associated with the skill system(s) 125 that is associated with the recognizer 863 implementing the IC component 864.

The intents identifiable by a specific IC component 864 may be linked to one or more skill system-specific grammar frameworks 876 with "slots" to be filled. Each slot of a grammar framework 876 corresponds to a portion of text data that a NER component 862 believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 876 may not be structured as sentences, but rather based on associating slots with grammatical tags.

For example, a NER component 862 may identify words in text data as subject, object, verb, preposition, etc. based on grammar rules and/or models prior to recognizing named entities in the text data. An IC component 864 (implemented by the same recognizer 863) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886, attempting to match words and phrases in the text data the NER component 862 previously tagged as a grammatical object or object modifier with those identified in the lexicon 886.

A NER component 862 may perform semantic tagging, which is the labeling of a word or combination of words according to their type/semantic meaning. A NER component 862 may parse text data using heuristic grammar rules, or a model may be constructed using techniques such as hidden Markov models, maximum entropy models, log linear models, conditional random fields (CRF), and the like. For example, a NER component 862, implemented by a music skill system or music domain recognizer 863, may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 may identify "Play" as a verb based on a word database associated with the music skill system or domain, which an IC component 864 may determine corresponds to a <PlayMusic> intent. At this stage, no determination has been made as to the meaning of "mother's little helper" and "the rolling stones," but based on grammar rules and models, the NER component 862 has determined that the text of these phrases relates to the grammatical object (i.e., entity).

The frameworks linked to the intent are then used to determine what database fields should be searched to determine the meaning of these phrases, such as searching a user's gazetteer 884 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 884 does not resolve a slot/field using gazetteer information, the NER component 862 may search a database of generic words (in the knowledge base 872). For example, if the text data corresponds to "play songs by the rolling stones," after failing to determine an album name or song name called "songs" by "the rolling stones," the NER component 862 may search a music skill system vocabulary for the word "songs." In the alternative, generic words may be checked before the gazetteer information, or both may be tried, potentially producing two different results.

A recognizer 863 may tag text data to attribute meaning thereto. For example, a recognizer 863 may tag "play mother's little helper by the rolling stones" as: {skill system} Music, {intent} Play Music, {artist name} rolling stones, {media type} SONG, and {song title} mother's little helper. For further example, a recognizer 863 may tag "play songs by the rolling stones" as: {skill system} Music, {intent} Play Music, {artist name} rolling stones, and {media type} SONG.

As described above, more than one recognizer 863 may process with respect to text data representing a single natural language input. In such instances, each recognizer 863 may output at least one NLU hypothesis including an intent indicator (determined by an IC component 864 of the recognizer 863) and at least one tagged named entity (determined by a NER component 862 of the recognizer 863).

The NLU component 260 may compile the NLU hypotheses (output by multiple recognizers 863) into cross-recognizer N-best list data 940. Each NLU hypothesis represented in the cross-recognizer N-best list data 940 may be associated with a respective score indicating a likelihood that the NLU hypothesis corresponds to the domain, one or more skill system 125, etc. associated with the recognizer 863 from which the NLU hypothesis was output. For example, the cross-recognizer N-best list data 940 may be represented as:

[0.95] Intent: <PlayMusic> ArtistName: Lady Gaga SongName: Poker Face
[0.70] Intent: <PlayVideo> ArtistName: Lady Gaga VideoName: Poker Face
[0.01] Intent: <PlayMusic> ArtistName: Lady Gaga AlbumName: Poker Face
[0.01] Intent: <PlayMusic> SongName: Pokerface The NLU component 260 may send the cross-recognizer N-best list data 940 to a pruning component 950, which sorts the NLU hypotheses, represented in the cross-recognizer N-best list data 940, according to their respective scores. The pruning component 950 may then perform score thresholding with respect to the cross-recognizer N-best list data 940. For example, the pruning component 950 may select NLU hypotheses, represented in the cross-recognizer N-best list data 940, associated with scores satisfying (e.g., meeting and/or exceeding) a threshold score. The pruning component 950 may additionally or alternatively perform number of NLU hypothesis thresholding. For example, the pruning component 950 may select a threshold number of top-scoring NLU hypotheses represented in the cross-recognizer N-best list data 940.

The pruning component 950 may generate cross-recognizer N-best list data 960 including the selected NLU hypotheses. The purpose of the pruning component 950 is to create a reduced list of NLU hypotheses so that downstream, more resource intensive, processes may only operate on NLU hypotheses that most likely represent the natural language input.

The NLU component 260 may include a light slot filler component 952 that takes text from slots, represented in the NLU hypotheses output by the pruning component 950, and alter it to make the text more easily processed by downstream components. The light slot filler component 952 may perform low latency operations that do not involve heavy operations such as reference to a knowledge base. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-recognizer N-best list data 960.

The NLU component 260 may send the cross-recognizer N-best list data 960 to an entity resolution component 970. The entity resolution component 970 can apply rules or other instructions to standardize labels or tokens in the NLU hypotheses represented in the cross-recognizer N-best list data 960. The precise transformation may depend on the skill system 125, domain, etc. to which a NLU hypothesis relates. For example, for a travel skill system NLU hypothesis, the entity resolution component 970 may transform text corresponding to "Boston airport" to the standard BOS three-letter code referring to the airport. The entity resolution component 970 can refer to a knowledge base that is used to specifically identify the precise entity referred to in each slot of each NLU hypothesis represented in the cross-recognizer N-best list data 960.

Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output N-best list data, altered from the cross-recognizer N-best list data 960, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 970 that are each specific to one or more different skill systems 125, domains, etc.

The entity resolution component 970 may not be successful in resolving every entity and filling every slot represented in the NLU hypotheses represented in the cross-recognizer N-best list data 960. This may result in the entity resolution component 970 outputting incomplete results. The NLU component 260 may include a ranker component 990 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 990 may assign the first NLU hypothesis a higher score than a second NLU hypothesis including at least one slot that is unfilled/unresolved by the entity resolution component 970.

The ranker component 990 may apply re-scoring, biasing, or other techniques. To do so, the ranker component 990 may consider not only the data output by the entity resolution component 970, but may also consider other data 991. The other data 991 may include a variety of information.

For example, the other data 991 may include skill system 125 rating or popularity data. For example, if one skill system 125 has a high rating, the ranker component 990 may increase the score of a NLU hypothesis associated with that skill system 125, and vice versa.

The other data 991 may additionally or alternatively include information about skill systems 125 that have been enabled by the user that originated the natural language input. For example, the ranker component 990 may assign higher scores to NLU hypotheses associated with enabled skill systems 125 than NLU hypotheses associated with skill systems 125 that have not been enabled by the user.

The other data 991 may additionally or alternatively include data indicating system usage history (e.g., specific to the user), such as if the user, that originated the natural language input, regularly invokes a particular skill system 125 or does so at particular times of day. The other data 991 may additionally or alternatively include data indicating date, time, location, weather, type of device 110, user identifier, context, as well as other information. For example, the ranker component 990 may consider when any particular skill system 125 is currently active (e.g., music being output by the skill system 125, a game being executed by the skill system 125, etc.).

The ranker component 990 may output NLU results data 985 including multiple NLU hypotheses, or a single NLU hypothesis. The NLU component 260 may send the NLU results data 285 to the orchestrator component 230.

In at least some examples, a user may include the natural language name of an assistant in a natural language input. For example, a user may say "Alexa, ask [assistant natural language name] to tell me the weather," in which "Alexa" is a wakeword and "ask [assistant natural language name] to tell me the weather" is a natural language input. The NLU component 260 may be identify assistant natural language names within natural language inputs. When the NLU component 260 (and more particularly a NER component 862) determines an assistant natural language name in text data input thereto, the NLU component 260 may indicate the assistant in one or more NLU hypotheses represented in the NLU results data 985. For example, an NLU hypothesis may include a tagged portion corresponding to the assistant natural language name. For further example, the NLU component 260 may query the assistant configuration storage 275 for an assistant identifier corresponding to the assistant natural language name. In such an example, the NLU component 260 may include the assistant natural language name and/or the assistant identifier in an NLU hypothesis.

After receiving the NLU results data 985, the orchestrator component 230 may send the NLU results data 985 to an intent/skill system pair ranker 1010. The intent/skill system pair ranker 1010 may determine, for intent indicator represented in the NLU results data 985, one or more skill systems 125 configured to execute with respect to the intent, resulting in the intent/skill system pair ranker 1010 generating intent/skill system pairs.

The intent/skill system pair ranker 1010 may include a statistical component that produces a ranked list of intent/skill system pairs with associated scores. Each score may indicate an adequacy of the skill system's proposed execution of the top-scoring NLU hypothesis. The intent/skill system pair ranker 1010 may operate one or more trained models configured to process NLU results data 985, potential result data 1015, and other data 1025 in order to generate ranked intent/skill system pairs.

The intent/skill system pair ranker 1010 may query each skill system 125, represented in the intent/skill system pairs, for potential result data 1015 representing a potential result of a skill system's processing with respect to the top-scoring NLU hypothesis represented in the NLU results data 985. For example, the intent/skill system pair ranker 1010 may send the top-scoring NLU hypothesis to a first skill system 125a (represented in a first intent/skill system pair of the intent/skill system pairs) along with an instruction for the first skill system 125a to indicate whether the first skill system 125a can execute with respect to the top-scoring NLU hypothesis, and optionally what action the first skill system 125a would perform in response to the top-scoring NLU hypothesis. The intent/skill system pair ranker 1010 may also send the top-scoring NLU hypothesis to a second skill system 125b (represented in a second intent/skill system pair of the intent/skill system pairs) along with an instruction for the second skill system 125b to indicate whether the second skill system 125b can execute with respect to the top-scoring NLU hypothesis, and optionally what action the second skill system 125b would perform in response to the top-scoring NLU hypothesis. The intent/skill system pair ranker 1010 may query skill systems 125 in parallel, substantially in parallel, or in series.

In response, the intent/skill system pair ranker 1010 may receive, from the first skill system 125a, first potential result data 1015a representing whether the first skill system 125a can execute with respect to the top-scoring NLU hypothesis, and optionally what action the first skill system 125a would perform in response to the top-scoring NLU hypothesis. The intent/skill system pair ranker 1010 may also receive, from the second skill system 125b, second potential result data 1015b representing whether the second skill system 125b can execute with respect to the top-scoring NLU hypothesis, and optionally what action the second skill system 125b would perform in response to the top-scoring NLU hypothesis.

Potential result data 1015 may include various components. For example, potential result data 1015 may simply indicate whether or not a skill system 125 can execute with respect to the top-scoring NLU hypothesis.

Potential result data 1015 may additionally or alternatively include outputtable data generated by a skill system 125 based on the top-scoring NLU hypothesis. In some situations, a skill system 125 may need further information, in addition to what is represented in the top-scoring NLU hypothesis, to provide outputtable data. In these situations, potential result data 1015 may indicate slots of a framework that the skill system 125 further needs filled and/or entities that the skill system 125 further needs resolved prior to the skill system 125 being able to provide outputtable data responsive to the top-scoring NLU hypothesis.

Potential result data 1015 may additionally or alternatively include an instruction indicating how the skill system 125 recommends the NLP system 120 query a user for further information needed by the skill system 125 to generate outputtable data. Potential result data 1015 may additionally include an indication of whether the skill system 125 will have all needed information after the user provides additional information a single time, or whether the skill system 125 will need the user to provide various kinds of additional information prior to the skill system 125 having all needed information to generate outputtable data.

The following are non-limiting examples of configurations of potential result data 1015:

Skill system 1: indication representing the skill system can execute with respect to the top-scoring NLU hypothesis Skill system 2: indication representing the skill system needs an additional resolved entity to generate outputtable data Skill system 3: indication representing the skill system can provide numerous outputtable data in response to the top-scoring NLU hypothesis The intent/skill system pair ranker 1010 may generate a score for each intent/skill system pair represented in the intent/skill system pairs. A score may be generated based on the potential result data 1015 provided by a skill system 125 corresponding to an intent/skill system pair. For example, a score for an intent/first skill system pair may be generated based on first potential result data 1015a provided by the first skill system 125a, whereas a score for an intent/second skill system pair may be generated based on second potential result data 1015b provided by the second skill system 125b. The intent/skill system pair ranker 1010 may generate numeric scores (e.g., from 0.0 to 1.0, or on some other scale) and/or binned scores (e.g., low, medium, high).

The intent/skill system pair ranker 1010 may prefer skill systems 125 that provide outputtable data over skill systems 125 that indicate further information is needed and skill systems 125 that indicate multiple outputtable data can be generated. For example, the intent/skill system pair ranker 1010 may increase the score, associated with an intent/skill system pair, whose skill system 125 simply provided outputtable data. For further example, the intent/skill system pair ranker 1010 may decrease the score, associated with an intent/skill system pair, whose skill system 125 indicated further information is needed. In another example, the intent/skill system pair ranker 1010 may decrease the score, associated with an intent/skill system pair, whose skill system 125 indicated multiple outputtable data could be generated.

The intent/skill system pair ranker 1010 may additionally or alternatively generate a score based on other data 1025.

The other data 1025 may include ratings associated with skill systems 125. A rating may be a NLP system 120 rating or a user-specific rating. A rating may indicate a veracity of a skill system 125 from the perspective of one or more users of the NLP system 120. For example, the intent/skill system pair ranker 1010 may increase a score, associated with an intent/skill system pair, if the skill system, of the pair, is associated with a rating satisfying (e.g., meeting or exceeding) a threshold rating. For further example, the intent/skill system pair ranker 1010 may decrease a score, associated with an intent/skill system pair, if the skill system, of the pair, is associated with a rating failing to satisfy the threshold rating.

The other data 1025 may additionally or alternatively indicate skill systems 125 enabled by the user that originated the natural language input (e.g., indicated as enabled in a user profile associated with a top-scoring user identifier output by the user recognition component 295 with respect to the natural language input). For example, the intent/skill system pair ranker 1010 may increase a score, associated with an intent/skill system pair, if the skill system, of the pair, is represented as enabled in a user profile corresponding to the user that originated the natural language input. For further example, the intent/skill system pair ranker 1010 may decrease a score, associated with an intent/skill system pair, if the skill system, of the pair, is not represented as enabled (e.g., is not represented) in the user profile of the user that originated the natural language input.

The other data 1025 may additionally or alternatively indicate output capabilities of a device 110 that will be used to output data, responsive to the natural language input, to the user. The system 100 may be configured with devices that include speakers but not displays, devices that include displays but not speakers, and devices that include speakers and displays. If the device 110, that will output data responsive to the natural language input, includes one or more speakers but not a display, the intent/skill system pair ranker 1010 may increase the score associated with an intent/skill system pair whose skill system is configured to output audible data (e.g., audio data and/or text data that may undergo TTS processing), and/or decrease the score associated with an intent/skill system pair whose skill system is configured to output visual data (e.g., image data and/or video data). If the device 110, that will output data responsive to the natural language input, includes a display but not one or more speakers, the intent/skill system pair ranker 1010 may increase the score associated with an intent/skill system pair whose skill system is configured to output visual data, and/or decrease the score associated with an intent/skill system pair whose skill system is configured to output audible data.

The other data 1025 may additionally or alternatively indicate the type of device 110 that captured the natural language input. For example, the device 110 may correspond to a "hotel room" type if the device 110 is located in a hotel room. If a user inputs a natural language input corresponding to "order me food" to a hotel room device, the intent/skill system pair ranker 1010 may increase the score associated with an intent/skill system pair corresponding to a room service skill system associated with the hotel, and/or decrease the score associated with an intent/skill system pair corresponding to a food skill system not associated with the hotel.

The other data 1025 may additionally or alternatively indicate a location of the device 110 and/or a geographic location represented in a user profile corresponding to the top-scoring user identifier output by the user recognition component 295 for the natural language input. A skill system 125 may be configured to only operate with respect to certain geographic locations. For example, a natural language input may correspond to "when is the next train to Portland." A first skill system 125a may operate with respect to trains that arrive at, depart from, and pass through Portland, Oregon. A second skill system 125b may operate with respect to trains that arrive at, depart from, and pass through Portland, Maine. If the device 110 is located at, and/or the user profile represents a geographic location of, Seattle, Washington, the intent/skill system pair ranker 1010 may increase the score associated with an intent/skill system pair corresponding to the first skill system 125a and/or decrease the score associated with an intent/skill system pair corresponding to the second skill system 125b. Likewise, if the device 110 is located at, and/or the user profile represents a geographic location of, Boston, Massachusetts, the intent/skill system pair ranker 1010 may increase the score associated with an intent/skill system pair corresponding to the second skill system 125b and/or decrease the score associated with an intent/skill system pair corresponding to the first skill system 125a.

The other data 1025 may additionally or alternatively indicate a time of day. A skill system 125 may be configured to operate with respect to certain times of day. For example, a natural language input may correspond to "order me food." A first skill system 125a may operate with respect to times of day corresponding to breakfast, whereas a second skill system 125b may operate with respect to times of day corresponding to the afternoon or evening. If the natural language input was received in the morning, the intent/skill system pair ranker 1010 may increase the score associated with an intent/skill system pair corresponding to the first skill system 125a and/or decrease the score associated with an intent/skill system pair corresponding to the second skill system 125b. Likewise, if the natural language input was received in the afternoon or evening, the intent/skill system pair ranker 1010 may increase the score associated with an intent/skill system pair corresponding to the second skill system 125b and/or decrease the score associated with an intent/skill system pair corresponding to the first skill system 125a.

The other data 1025 may additionally or alternatively include user preferences represented in a user profile corresponding to the top-scoring user identifier output by the user recognition component 295 for the natural language input. In at least some examples, multiple skill systems 125 may be configured to execute in substantially the same manner. For example, a first skill system 125a and a second skill system 125b may both be configured to order food from respective restaurants. The NLP system 120 may store a user preference (e.g., in a user profile corresponding to the top-scoring user identifier output by the user recognition component 295 for the natural language input) indicating the user prefers the first skill system 125a over the second skill system 125b. As a result, the intent/skill system pair ranker 1010 may increase the score associated with an intent/skill system pair corresponding to the first skill system 125a and/or decrease the score associated with an intent/skill system pair corresponding to the second skill system 125b.

The other data 1025 may additionally or alternatively include a system usage history associated with the top-scoring user identifier output by the user recognition component 295 for the natural language input. For example, the system usage history may indicate the user has input natural language inputs that invoke a first skill system 125a more often than the user inputs natural language inputs that invoke a second skill system 125*b*. Based on this, if the present natural language input may be executed by both the first skill system 125*a* and the second skill system 125*b*, the intent/skill system pair ranker 1010 may increase the score associated with an intent/skill system pair corresponding to the first skill system 125*a* and/or decrease the score associated with an intent/skill system pair corresponding to the second skill system 125*b*.

The other data 1025 may additionally or alternatively indicate a speed at which the device 110, that received the natural language input, is traveling. For example, the device 110 may be located in a moving vehicle, or may be a moving vehicle itself. When a device 110 is in motion, the intent/skill system pair ranker 1010 may be configured to prefer audible outputs rather than visual outputs to decrease the likelihood of distracting a driver of a vehicle. Thus, for example, if the device 110 is moving at or above a threshold speed (e.g., a speed above an average user's walking or running speed), the intent/skill system pair ranker 1010 may increase the score associated with an intent/skill system pair corresponding to a first skill system 125*a* that generates audio data or text data that can be converted into audio data using TTS processing. The intent/skill system pair ranker 1010 may additionally or alternatively decrease the score associated with an intent/skill system pair corresponding to a second skill system 125*b* that generates image data or video data.

The other data 1025 may additionally or alternatively indicate a length of time between when a skill system 125 received a query from the intent/skill system pair ranker 1010 and when the skill system 125 provided potential result data 1015 in response thereto. When the intent/skill system pair ranker 1010 queries multiple skill systems 125, the skill systems 125 may respond at different speeds. The intent/skill system pair ranker 1010 may implement a latency budget. For example, if the intent/skill system pair ranker 1010 determines a skill system 125 responds to a query of the intent/skill system pair ranker 1010 within a threshold length of time from receiving the query, the intent/skill system pair ranker 1010 may increase the score associated with an intent/skill system pair corresponding to that skill system 125. Conversely, if the intent/skill system pair ranker 1010 determines a skill system 125 does not respond to a query of the intent/skill system pair ranker 1010 within a threshold length of time from receiving the query, the intent/skill system pair ranker 1010 may decrease the score associated with an intent/skill system pair corresponding to that skill system 125.

One skilled in the art will appreciate that the foregoing other data 1025 is illustrative, and that other or additional other data 1025 may be considered by the intent/skill system pair ranker 1010 when determining scores for intent/skill system pairs. Moreover, while foregoing examples describe determining scores for first and second skill systems (125*a*/125*b*), one skilled in the art will appreciate that the intent/skill system pair ranker 1010 may determine scores for more than two skill systems.

The intent/skill system pair ranker 1010 may implement one or more trained models for determining scores based on potential result data 1015 and other data 1025. The model(s) of the intent/skill system pair ranker 1010 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the intent/skill system pair ranker 1010, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The intent/skill system pair ranker 1010 may send the ranked intent/skill system pairs 1035 to the orchestrator component 230. In some instances, the intent/skill system pair ranker 1010 may be configured to determine assistant identifiers, corresponding to assistants to be invoked with respect to user inputs. In such examples, one or more of the ranked intent/skill system pairs 1035 may be associated a respective assistant identifier.

The orchestrator component 230 may send (1102) the ranked intent/skill system pairs 1035 to a plan generator 1170 (implementable by the NLP system 120 and illustrated in FIG. 11A). The orchestrator component 230 may additionally send (1104) the NLU results data 985 to the plan generator 1170. The orchestrator component 230 may additionally send (1106) assistant trigger data to the plan generator 1170. The assistant trigger data represents, a wakeword, assistant identifier, wake event, device type, spoken natural language name, and/or some other assistant trigger received or determined by the orchestrator component 230 and/or NLU component 260 as described herein above.

The plan generator 1170 may determine (1108) an assistant whose configurations should be used to respond to the natural language input. The plan generator 1170 may make such determination based on the assistant trigger data and the ranked intent/skill system pairs 1035. The plan generator 1170 may determine one or more assistants corresponding to the assistant trigger data and associated with the skill system 125 (corresponding to the top-scoring intent/skill system pair of the ranked intent/skill system pairs 1035) in the assistant configuration storage 275.

In at least some instances, the plan generator 1170 may determine a single assistant corresponds to the assistant trigger data and is associated with the top-scoring skill system 125 in the assistant configuration storage 275. In such instances, the plan generator 1170 has effectively determined that assistant as being the one whose configurations should be used to respond to the natural language input.

In at least some instances, the plan generator 1170 may determine multiple assistants correspond to the assistant trigger data and is associated with the top-scoring skill system 125 in the assistant configuration storage 275. In such instances, the plan generator 1170 may determine a single assistant, of the multiple assistants, based on the assistant trigger type. The plan generator 1170 may have access to a ranked list of assistant trigger types. In at least some examples, the assistant trigger, corresponding to an assistant natural language name being represented in a natural language input, may have the highest ranking in the ranked list of assistant trigger types. Such may ensure that the plan generator 1170 is biased towards assistants users explicitly request in natural language inputs.

The plan generator 1170 may compare the determined multiple assistants against the assistant trigger data, and determine the assistant, corresponding to the highest ranked assistant trigger type in the assistant trigger data, as being the assistant whose configurations should be used to respond to the natural language input.

In at least some instances, the plan generator 1170 may determine no assistants represented in the assistant configuration storage 275, correspond to the assistant trigger data and are associated with the top-scoring skill system. In such instances, the plan generator 1170 may determine a default assistant, of the NLP system 120, as being the assistant whose configurations should be used to respond to the natural language input. In at least some examples, trigger data may correspond to the default assistant. For example, the user may speak a wakeword corresponding to the default assistant and/or the user's profile may represent the default assistant as a preferred assistant.

Each assistant (and more particularly each assistant identifier) may be associated with a particular assistant skill system configured to generate plan data representing how the natural language input should be responded to in view of configurations associated with an assistant (and more particularly an assistant identifier). The plan generator 1170 may determine (1110) an assistant skill system 1180 associated with the assistant determined at step 1108.

The plan generator 1170 may generate (1112) plan data based on the top-scoring NLU hypothesis in the NLU results data 985. The plan data may, in at least some examples, correspond to the top-scoring NLU hypothesis. For example, if the top-scoring NLU hypothesis corresponds to [Intent: <OutputWeather>; Location: Seattle, Washington], the plan data may correspond to

```
Directive[
    Response.Speak["The temperature for
    Seattle, Washington today is a high of _
    and a low of _."]
]
```

The plan generate 1170 may send (1114) the plan data to the assistant skill system 1180.

The assistant skill system 1180 may have access to configuration data corresponding to the assistant (represented by the assistant identifier with which the assistant skill system 1180 is associated). An assistant's configuration data may represent whether and what editorial content is to be output prior to content provided by a skill system 125 (e.g., TTS-generated audio output to a user to preface the output of content provided by a skill system 125). An assistant's configuration data may additionally or alternatively represent whether and what editorial content is to be output after content provided by a skill system 125 (e.g., TTS-generated audio output to a user after the output of content provided by a skill system 125). An assistant's configuration data may additionally or alternatively represent how substance of content, provided by a skill system 125, is to be output (e.g., whether temperature information is to be configured in Fahrenheit or Celsius; whether measures of distance are to be configured in meters, kilometers, inches, feet, and/or miles; whether content is to be output in a succinct or verbose sentence structure; whether content is to include certain words from a lexicon corresponding to the particular assistant; etc.). The assistant skill system 1180 may generate (1116) updated plan data based on configurations associated with the assistant. Using [Intent: <OutputWeather>; Location: Seattle, Washington] plan data as an example, an assistant skill system 1180 associated with an Australian voiced assistant may generated updated plan data corresponding to:

```
Directive[
    Response.Speak[
        SSML[australian accent]"The temperature
        for Seattle, Washington, home of the
        Seattle Seahawks, today is a high of _
        <Fahrenheit> and a low of _
        <Fahrenheit>.]
]
```

The assistant skill system 1180 may send (1118) the updated plan data to the plan generator 1170, which may send (1120) the updated plan data to a plan executor 1190 (which may be implemented by the NLP system 120). The plan executor 1190 may be configured to coordinate data transmissions based on the updated plan data.

Figure 12A:
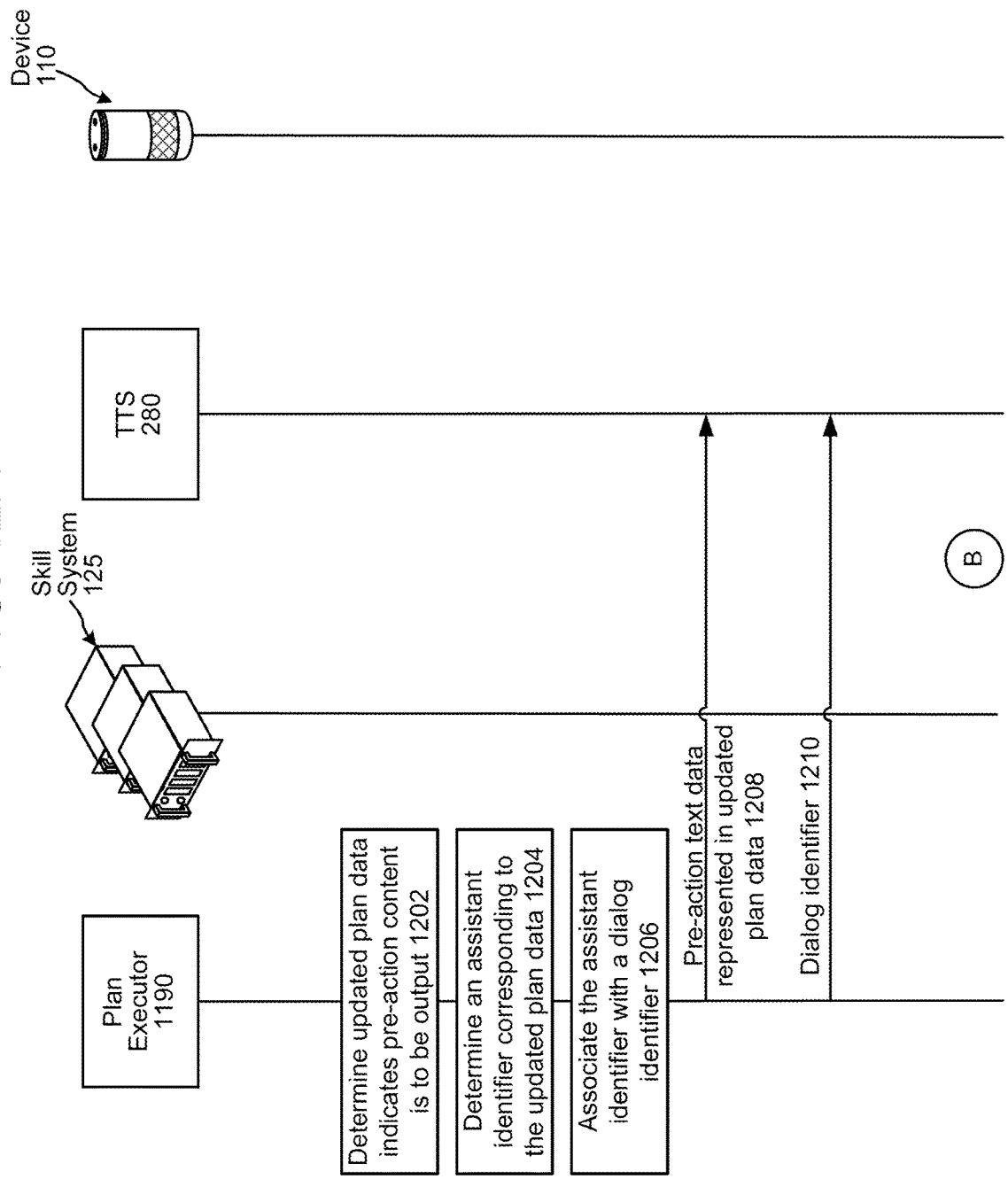
Figure 12C:
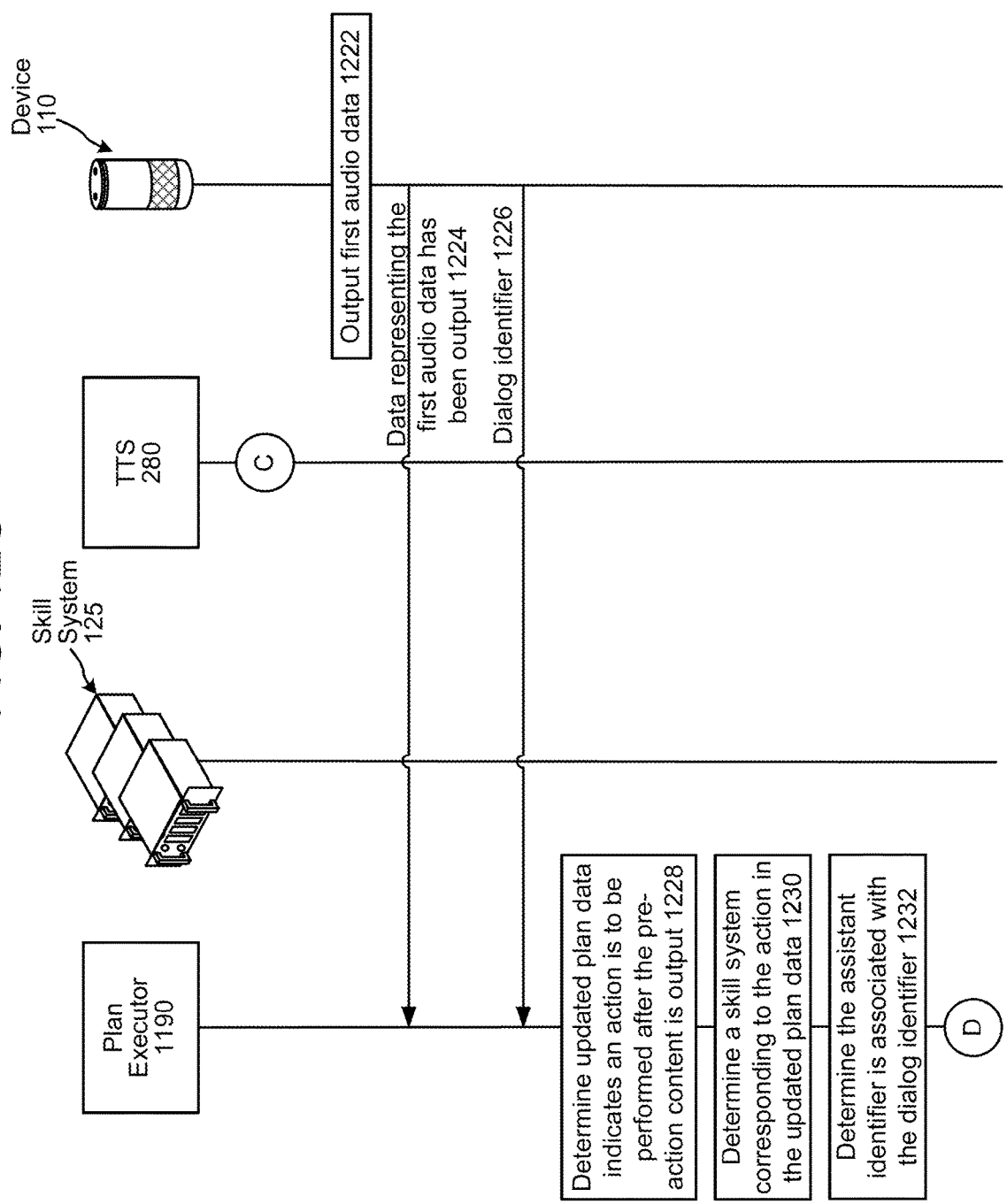

The plan executor 1190 may send data transmissions to an assistant skill system 1180, a skill system 125, and a device 110 based on configuration of the updated plan data (as illustrated in FIG. 12A). For example, the plan executor component 1190 may determine (1202) the updated plan data indicates pre-action content is to be output prior to content provided by a skill system 125 that is directly responsive to the natural language input (e.g., the top-scoring NLU hypothesis). Thereafter, the plan executor 1190 determine (1204) an assistant identifier corresponding to the updated plan data and associate (1206) the assistant identifier with a dialog identifier corresponding to the natural language input. Such association may result in the assistant (corresponding to the assistant identifier) as being considered the active assistant for the dialog corresponding to the dialog identifier.

As used herein, a "dialog" may refer to data transmissions (such as relating to multiple user inputs and NLP system 120 outputs) between the NLP system 120 and a device(s) 110 that all relate to a single originating user input. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier.

The plan executor 1190 may send (1208) pre-action text data (represented in the updated plan data) to the TTS component 280. The plan executor 1190 may also send (1210) the dialog identifier to the TTS component 280. The plan executor 1190 may also send (1212) the assistant identifier to the TTS component 280.

The TTS component 280 may determine (1214) a voice model associated with the assistant identifier. The voice model may represent how synthesized speech is to be configured to sound like the assistant corresponding to the assistant identifier. The TTS component 280 may generate (1216) audio data corresponding to the pre-action text data using the voice model, resulting in the audio data including synthesized speech in a voice corresponding to the assistant. The TTS component 280 may send (1218), for example via the orchestrator component 230, the audio data to the device 110 that received the natural language input (or another device associated with the same profile in the profile storage 270). The TTS component 280 may also send (1220), for example via the orchestrator component 230, the dialog identifier to the device 110.

The device 110 may thereafter output (1222) the audio data. When the device 110 has finished outputting the audio data, the device 110 may send (1224) data, representing the audio data has been output, to the NLP system 120. The device 110 may additionally send (1226) the dialog identifier to the NLP system 120. The orchestrator component 230 may receive the aforementioned data and dialog identifier, and route same to the plan executor 1190.

The plan executor 1190 may determine (1228) the updated plan data indicates an action (responsive to the natural language input) is to be performed after the pre-action content is output. After determining such, the plan executor 1190 may determine (1230) a skill system 125 corresponding to the in the updated plan data (e.g., corresponding to the top-ranked intent/skill system pair in the ranked intent/skill system pairs 1035). The plan executor 1190 may also determine (1232) the assistant identifier is still associated with the dialog identifier (representing the assistant corresponding to the assistant identifier is still the active assistant for the dialog). The plan executor 1190 may send (1234), to the skill system 125, the top-scoring NLU hypothesis output by the NLU component 260. The plan executor 1190 may also send (1236) the dialog identifier to the skill system 125. The plan executor 1190 may also send (1238) the assistant identifier to the skill system 125.

The skill system 125 may determine (1240) text data responsive to the top-scoring NLU hypothesis. The skill system 125 may send (1242) the text data to the TTS component 280. The skill system 125 may additionally send (1244) the assistant identifier to the TTS component 280. The skill system 125 may additionally send (1246) the dialog identifier to the TTS component 280.

The TTS component 280 may determine (1248) a voice model associated with the assistant identifier. The TTS component 280 may generate (1250) audio data corresponding to the text data using the voice model, resulting in the audio data including synthesized speech in a voice corresponding to the assistant. The TTS component 280 may send (1252), for example via the orchestrator component 230, the audio data to the device 110 that that output the pre-action content (or another device associated with the same profile in the profile storage 270). The TTS component 280 may also send (1254), for example via the orchestrator component 230, the dialog identifier to the device 110.

The device 110 may thereafter output (1256) the audio data. When the device 110 has finished outputting the audio data, the device 110 may send (1258) data, representing the audio data has been output, to the NLP system 120. The device 110 may additionally send (1260) the dialog identifier to the NLP system 120. The orchestrator component 230 may receive the aforementioned data and dialog identifier, and route same to the skill system 125 since the skill system 125 sent the action text data to the TTS component 280 for output to the user. The skill system 125 may send (1262), to the plan executor 1190, data representing the action has been performed. The skill system 125 may also send (1264) the dialog identifier to the plan executor 1190.

After receiving the data and dialog identifier, if the plan executor 1190 determines the updated plan data indicates post-action content is to be output, steps similar to 1204 through 1236 may be performed with respect to the post-action content. If, instead, the plan executor 1190 determines the action corresponds to an end of the updated plan data, the plan executor 1190 may delete (1266) the association between the assistant identifier rand the dialog identifier. Such association deletion may result in the assistant no longer being considered the active assistant for the dialog.

As described above, more than one assistant may execute with respect to a dialog. In at least some examples, each action to be performed may be assigned a different dialog identifier, and each action may be executed using a single assistant. In these examples, only one assistant may execute with respect to a dialog identifier.

In at least some examples, a directive could be sent to a skill system to respond to a natural language input using a single assistant. However, an assistant skill system, corresponding to the assistant, may output payload (e.g., updated plan data at step 1118) indicating at least some of the response to the natural language input should be handled by at least one other assistant.

As described above with respect to FIGS. 12A through 12F, audio data including synthesized speech (having speech characteristics of an assistant) may be output to a user. One skilled in the art will appreciate that the disclosure is not limited thereto. For example, text may be output to a user, with the text having characteristics (e.g., word choice) specific to an assistant.

In at least some examples, more than one assistant's voice may be used to output data to one or more user's over the course of a dialog. For example, a first assistant's voice may be used to output one or more instances of data to a user. Thereafter, during the same dialog, a second assistant's voice may be used to output one or more instances of data to the user or a different user. Thereafter, during the same dialog, the first assistant's voice or a third assistant's voice may be used to output one or more instances of data to a previous user of the dialog or a new user of the dialog.

As described above, more than one user may interact with the NLP system 120 as part of the same dialog. For example, a device may be located in a home having multiple individuals. Each individual may have a preferred assistant, which may be different from other individuals in the household. For example, each user may have a user profile representing a different assistant. When the NLP system 120 receives a natural language input as part of a dialog, the NLP system 120 may perform user recognition 295 to identify the user, may determine a preferred assistant in the user's profile, and may output data to the user using the preferred assistant's voice. In view of the foregoing, if multiple users provide natural language inputs during the same dialog, multiple assistants' voices may be used to output data to the multiple users. For example, a first user's preferred assistant's voice may be used to output data in response to natural language inputs provided by the first user, a second user's preferred assistant's voice may be used to output data in response to natural language inputs provided by the second user, etc. In this way, if different users are providing inputs to the system as part of a same dialog, the system may respond to each user in that user's preferred assistant's voice. This may be true even if the users are engaged with the dialog using a same device or different devices. It may of course also be true for users engaged in their own independent dialogs with the system.

In at least some examples, a group profile (corresponding to two or more user profiles) may have a preferred assistant (e.g., may include a preferred assistant's identifier). For example, a group profile associated with a household may have a particular preferred assistant for that household. During a dialog, when a user (having a profile encompassed by the group profile) speaks a natural language input, the preferred assistant of the group profile may be used to respond to the natural language input. During the same dialog, if a natural language input is spoken by a user unknown to the NLP system 120 (e.g., user recognition processing 295 of the spoken natural language input outputs a user recognition score below a threshold user recognition score), the NLP system 120 may select a NLP system default assistant for responding to the natural language input.

There may be various ways to determine when one dialog has ended and another dialog should begin (e.g., a new dialog identifier is to be associated with a received natural language input). In at least some examples, the NLP system 120 may determine a dialog has ended once data, completing a response to an NLU intent representing a dialog-initiating natural language input, has been output. In at least some examples, the NLP system 120 may determine a dialog has ended based on a duration of time elapsing since receipt of a dialog-initiating natural language input and/or receipt of a most recently received natural language input received from the same device and/or provided by the same user. In at least some examples, the NLP system 120 may determine a dialog has ended based on most recently output data and a received natural language input corresponding to different domains. In at least some examples, the NLP system 120 may determine a dialog has ended based on more than one of the foregoing factors.

The foregoing description describes processing that may be performed with respect to natural language inputs that result in a single action. In at least some instances, a user may provide a natural language input that results in more than one action being performed by one or more skill systems 125. For example, a natural language input of "play Adele at volume six" may correspond to a first action of outputting music sung by an artist named Adele (e.g., corresponding to a first NLU intent of <PlayMusic>), and a second action of sending an output volume of the music to a setting of 6 (e.g., corresponding to a second NLU intent of <SetDeviceVolume>). For further example, a natural language input of "play jazz music and dim the lights and lock the doors" may correspond to three actions: (1) outputting jazz music (e.g., corresponding to a first NLU intent of <PlayMusic>); (2) dimming smart lights (e.g., corresponding to a second NLU intent of <DimLights>); and (3) locking smart locks of doors (e.g., corresponding to a third NLU intent of <LockDoors>). In another example, a natural language input of "output the weather and play jazz music" may correspond to a first action of outputting weather information and a second action of outputting jazz music.

Figure 13D:
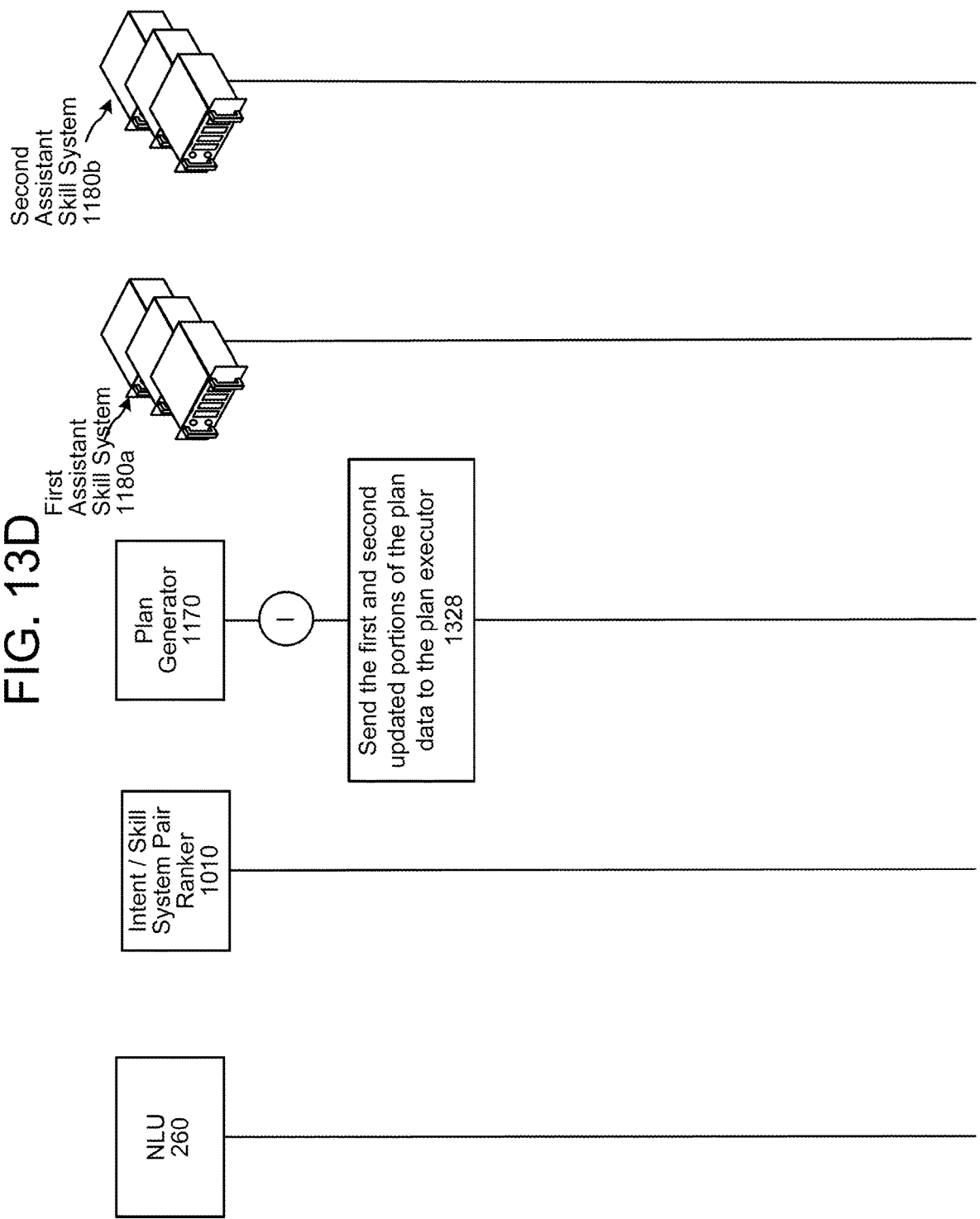

When the NLU component 260 receives text data representing a natural language input corresponding to more than one action, the NLU component 260 may generate (1302 as illustrated in FIG. 13A) a NLU hypothesis corresponding to the more than one action. The NLU hypothesis may include an intent indicator corresponding to each action, with each intent indicator being associated with respective tagged text data by NER processing. For example, a single NLU hypothesis for the natural language input "play Adele at volume six" may be represented as:

Intent: <PlayMusic>; ArtistName: Adele
Intent: <SetDeviceVolume>; VolumeLevel: 6

For further example, a single NLU hypothesis for the natural language input "play jazz music and dim the lights and lock the doors" may be represented as:

Intent: <PlayMusic>; Genre: Jazz
Intent: <DimLights>; DeviceID: 12kjfdb3
Intent: <LockDoors>; DeviceID: 15fdf6;
DeviceID: 35jklfd96

In a further example, a single NLU hypothesis for the natural language input "output the weather and play jazz music" may be represented as:

Intent: <OutputWeather>;
Location: Seattle, Washington
Intent: <PlayMusic>; Genre: Jazz The NLU component 260 may send (1304), for example via the orchestrator component 230, the NLU hypothesis to the intent/skill system pair ranker 1010. The intent/skill system pair ranker 1010 may generate (1306) an intent/skill system pair for each action represented in the NLU hypothesis. Thereafter, the intent/skill system pair ranker 1010 may send (1308) the generated intent/skill system pairs to the plan generator 1170 (for example via the orchestrator component 230).

The plan generator 1170 may determine (1310), for each intent/skill system pair (each corresponding to a different action in the NLU hypothesis), an assistant whose configurations should be used to perform the action. The plan generator 1170 may make such determinations based on assistant trigger data and intent/skill system pairs as described herein above.

The plan generator 1170 may determine (1312) a first assistant skill system 1180a associated with a first assistant whose configurations are to be used to perform a first action represented in the NLU hypothesis. The plan generator 1170 may send (1314) a first portion of plan data, corresponding to the first action, to the first assistant skill system 1180a.

The first assistant skill system 1180a may update (1316) the first portion of the plan data based on configurations associated with the first assistant. The first assistant skill system 1180a may thereafter send (1318) the updated first portion of the plan data to the plan generator 1170.

The plan generator 1170 may also determine (1320) a second assistant skill system 1180b associated with a first assistant whose configurations are to be used to perform a second action represented in the NLU hypothesis. The plan generator 1170 may send (1322) a second portion of the plan data, corresponding to the second action, to the second assistant skill system 1180b.

The second assistant skill system 1180b may update (1324) the second portion of the plan data based on configurations associated with the second assistant. The second assistant skill system 1180b may thereafter send (1326) the updated second portion of the plan data to the plan generator 1170.

FIGS. 13A through 13D describe processing that may be performed when a natural language input corresponds to two actions and two assistants. One skilled in the art will appreciate that the present disclosure is not limited thereto. That is, one skilled in the art will appreciate that the processing described with respect to FIGS. 13A through 13D may be performed for natural language inputs that correspond to more than two actions and two or more assistants. In at least some examples, a single assistant may correspond to two or more actions of a natural language input corresponding to more than one action.

The plan generator 1170 may thereafter send (1328) the first and second updated portions of the plan data to the plan executor 1190. The plan executor 1190 may thereafter coordinate data transmissions as described with respect to FIGS. 12A through 12F above. However, after deleting the association at step 1276, the plan executor 1190 may determine a next assistant in the plan data, associate that assistant's identifier with the dialog identifier, and then perform processing with respect to that assistant. Once processing with respect to this second assistant's configurations are completed, the plan executor 1190 may delete the association between the second assistant's identifier and the dialog identifier. If the plan executor 1190 determines the second assistant the last assistant in the plan data, the plan executor 1190 may cease processing. Conversely, if the plan executor 1190 determines a third assistant (which may be the first assistant or a different assistant from the first and second assistants) is represented in the plan data after the second assistant, the plan executor 1190 may coordinate processing with respect to the third assistant. The foregoing processing may be performed with respect to N assistants until the plan executor 1190 has determined processing has been completed with respect to the last assistant represented in the plan data.

As described with respect to FIGS. 13A through 13D, all portions of plan data may be updated by all assistants corresponding to the plan prior to the updated plan data being sent to the plan generator 1170. In at least some examples, plan data portions may be updated in parallel to plan data being executed. For example, plan data may include a first portion corresponding to a first assistant and a second portion corresponding to a second assistant. The plan generator 1170 may send the first portion of the plan data to the first assistant skill system 1180a and receive therefrom the updated first portion of the plan data. Then, rather than sending the second portion of the plan data to the second assistant skill system 1180b, the plan generate 1170 may send the updated first portion of the plan data to the plan executor 1190, which may coordinate processing as described with respect to FIGS. 12A through 12F. While or after the plan executor 1190 coordinates processing with respect to the updated first portion of the plan data, the plan generator 1170 may send the second portion of the plan data to the second assistant skill system 1180b and receive therefrom the updated second portion of the plan data. Then, while or after the plan executor 1190 is coordinating processing with respect to the updated first portion of the plan data, the plan generator 1170 may send the updated second portion of the plan data to the plan executor 1190, which may thereafter coordinate processing with respect to the updated second portion of the plan data.

As described above, a plan may be dynamic. That is, a plan may be generated and updated at runtime. Alternatively, a plan may be pre-generated during offline operations, and recalled at runtime. For example, the NLP system 120 may receive a signal from a device 110, with the signal representing one or more commands and one or more corresponding assistants. Various types of signals include, for example, the triggering of a motion sensor, the scoring of a touch down by a professional sports team, the unlocking of a smart lock, etc. The NLP system 120 may store a plurality of pre-stored plans, with each corresponding to a unique identifier and/or criteria. The NLP system 120 may, in at least some examples, bypass NLU processing of the received signal and simply use the received signal as an index into a database of pre-stored plans to identify a pre-stored plan corresponding to the signal. Once the pre-stored plan has been identified, post-plan generation processing described herein above may be performed (e.g., that described with respect to FIGS. 12A through 13D).

At least some assistants of the NLP system 120 may be free to users of the NLP system 120. Other assistants of the NLP system 120 may be purchased or subscribed to by users. In other words, a certain assistant may not be enabled for responding to natural language inputs of a user unless the user enables the assistant, for example by purchasing or subscribing to the assistant's functionality. For such assistants, after the NLP system 120 receives a natural language input and recognizes the user that provided the natural language input, the NLP system 120 may check the user's profile to determine which assistants have been purchased by and/or enabled for the user. In such instances, the NLP system 120 may use a certain assistant's voice to respond to the natural language input only if the assistant's functionality has been enabled for the user.

As described above, a subscription assistant may be represented in a user's profile, representing the pay-for assistant may be used to respond to the user's natural language inputs. For example, an identifier corresponding to the subscription assistant may be indicated as enabled in a manner associated with or stored in the user's profile. In at least some examples, an enabled assistant (e.g., through the enabled assistant's identifier) may be represented in a group profile corresponding to a plurality of user profiles. In such examples, the enabled assistant may be used to respond to natural language inputs provided by users corresponding to any of the user profiles associated with the group profile.

In at least some examples, the NLP system 120 may prompt a user to enable a particular assistant based on data the user requested be output. For example, if the NLP system 120 receives a natural language input requesting the output of music sung by a particular artist, the NLP system 120 may prompt the user to purchase or subscribe to the artist's assistant, thereby enabling the artist's voice to be used when prefacing the output of music sung by the artist (and/or other artists).

At least some assistants of the NLP system 120 may not be appropriate for users of all ages. For example, at least some assistant may use language (e.g., profanity) that is appropriate for adult users (e.g., users 18 years of age or older) but not child users (e.g., users under the age of 18). When the NLP system 120 receives a natural language input and recognizes the user the provided the natural language input, the NLP system 120 may determine an age represented in the user's profile. The NLP system 120 may use the determined age to determine which assistant may be used to respond to the natural language input. Alternatively or in addition, the system may allow the assistant to be used to respond to a child input but may filter out responses that may be inappropriate for children and select on child-appropriate responses in such instances.

At least some assistants of the NLP system 120 may have multiple versions of personality and/or substantively content. For example, an assistant may have a non-explicit version (that does not include swear words in output content) and an explicit version (that includes swear words in output content). In at least some examples, only users of at least a certain age may receive output content using an explicit version of an assistant.

In at least some other examples, the NLP system 120 may estimate the user's age based on characteristics of a spoken natural language input. For example, child users may speak natural language inputs with characteristics (e.g., pitch, tone, word choice, etc.) differently from how adult users may speak natural language inputs. When the NLP system 120 receives a spoken natural language input, the NLP system 120 may extrapolate an age of the user from the characteristics of the spoken natural language input. Such extrapolated age may be an age range (e.g., 5 to 10 years old), a younger than age range (e.g., younger than 10 years old), an older than age range (e.g., older than 10 years old), a user classification age (e.g., child v. adult), or the like. The NLP system 120 may use the extrapolated age to determine which assistant and/or responses may be used to respond to the natural language input.

As described herein, particular TTS configurations may be used to generate synthesized speech in the voice of a particular NLP system assistant. In at least some examples, the NLP system 120 may store recordings of human speech, with the human that spoke the recordings corresponding to a NLP system assistant. Accordingly, a NLP system assistant may correspond to both recordings of a human's speech and particular TTS configurations that generate synthesized speech in the human's voice.

Figure 14:
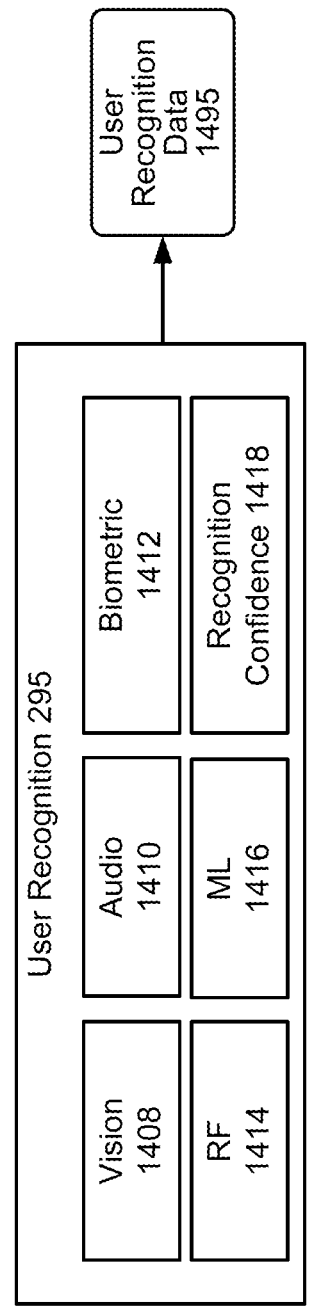
FIG. 14 is a schematic diagram of an illustrative architecture in which sensor data is combined to recognize one or more users, in accordance with embodiments of the present disclosure.

As described above, the NLP system 120 may include a user recognition component 295. The user recognition component 295 may recognize one or more users using a variety of data. As illustrated in FIG. 14, the user recognition component 295 may include one or more subcomponents including a vision component 1408, an audio component 1410, a biometric component 1412, a radio frequency (RF) component 14, a machine learning (ML) component 1416, and a recognition confidence component 1418. In some instances, the user recognition component 295 may monitor data and determinations from one or more subcomponents to recognize an identity of one or more users associated with data input to the NLP system 120. The user recognition component 295 may output user recognition data 1495, which may include a user identifier associated with a user the user recognition component 295 believes originated data input to the NLP system 120. The user recognition component 295 may be used to inform processes performed by various components of the NLP system 120 as described herein.

The vision component 1408 may receive data from one or more sensors capable of providing images (e.g., cameras) or sensors indicating motion (e.g., motion sensors). The vision component 1408 can perform facial recognition or image analysis to determine an identity of a user and to associate that identity with a user profile associated with the user. In some instances, when a user is facing a camera, the vision component 1408 may perform facial recognition and identify the user with a high degree of confidence. In other instances, the vision component 1408 may have a low degree of confidence of an identity of a user, and the user recognition component 295 may use determinations from additional components to determine an identity of a user. The vision component 1408 can be used in conjunction with other components to determine an identity of a user. For example, the user recognition component 295 may use data from the vision component 1408 with data from the audio component 1410 to identify what user's face appears to be speaking at the same time audio is captured by a device 110 the user is facing for purposes of identifying a user who spoke an input to the NLP system 120.

The overall system of the present disclosure may include biometric sensors that transmit data to the biometric component 1412. For example, the biometric component 1412 may receive data corresponding to fingerprints, iris or retina scans, thermal scans, weights of users, a size of a user, pressure (e.g., within floor sensors), etc., and may determine a biometric profile corresponding to a user. The biometric component 1412 may distinguish between a user and sound from a television, for example. Thus, the biometric component 1412 may incorporate biometric information into a confidence level for determining an identity of a user. Biometric information output by the biometric component 1412 can be associated with specific user profile data such that the biometric information uniquely identifies a user profile of a user.

The RF component 1414 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1414 the strength of the signal (e.g., as a received signal strength indication (RSSI)). The RF component 1414 may use the RSSI to determine an identity of a user (with an associated confidence level). In some instances, the RF component 1414 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the NPL system 120 for purposes of the NLP system 120 determining who spoke a particular input. Such a registration may occur prior to, during, or after speaking of an input.

The ML component 1416 may track the behavior of various users as a factor in determining a confidence level of the identity of the user. By way of example, a user may adhere to a regular schedule such that the user is at a first location during the day (e.g., at work or at school). In this example, the ML component 1416 would factor in past behavior and/or trends in determining the identity of the user that provided input to the NLP system 120. Thus, the ML component 1416 may use historical data and/or usage patterns over time to increase or decrease a confidence level of an identity of a user.

In at least some instances, the recognition confidence component 1418 receives determinations from the various components 1408, 1410, 1412, 1414, and 1416, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1495.

The audio component 1410 may receive data from one or more sensors capable of providing an audio signal (e.g., one or more microphones) to facilitate recognition of a user. The audio component 1410 may perform audio recognition on an audio signal to determine an identity of the user and associated user identifier. In some instances, aspects of the NLP system 120 may be configured at a computing device (e.g., a local server). Thus, in some instances, the audio component 1410 operating on a computing device may analyze all sound to facilitate recognition of a user. In some instances, the audio component 1410 may perform voice recognition to determine an identity of a user.

The audio component 1410 may also perform user identification based on audio data 211 input into the NLP system 120 for speech processing. The audio component 1410 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 1410 may perform user recognition by comparing speech characteristics represented in the audio data 211 to stored speech characteristics of users (e.g., stored voice profiles associated with the device 110 that captured the spoken user input).

Figure 15:
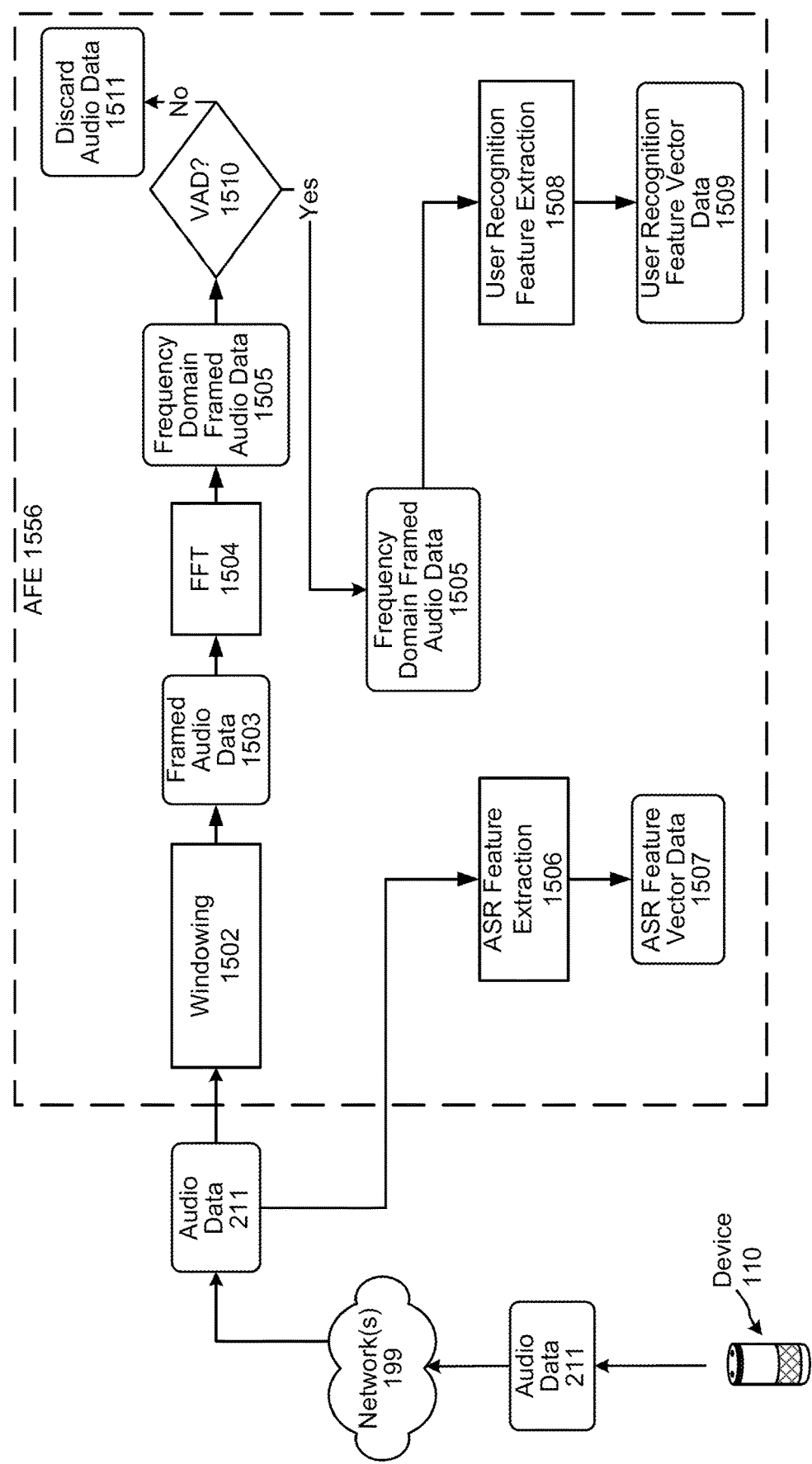
FIG. 15 is a flow diagram illustrating processing performed to prepare audio data for ASR processing and user recognition processing, in accordance with embodiments of the present disclosure.

FIG. 15 illustrates processing performed to prepare audio data for ASR processing and user recognition processing. As described, the device 110 sends audio data 211 through a network(s) 199 to the NLP system 120 for processing. The NLP system 120 may include an acoustic front end (AFE) 1556 (or other component(s)) that performs various functions on the audio data 211 to prepare the audio data 211 for further downstream processing, such as ASR processing and/or user recognition processing. For example, the AFE 1556 may perform (1502) windowing functions on the audio data 211 to create framed audio data 1503 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 1556 may then perform (1504) a fast Fourier transform (FFT) that converts the waveforms in each frame of the framed audio data 1503 from its original domain (e.g., time) to a representation in a frequency domain (thereby creating frequency domain framed audio data 1505). Audio processing techniques other than or in addition to FFT may be used to transform audio data (e.g., waveforms) into data that can be processed as needed.

The NLP system 120 (through the AFE 1556 or using another component) then detects (1510) whether voice activity (i.e., speech) is present in the post-FFT waveforms (i.e., frequency domain framed audio data 1505). The VAD detector 1510 (or other components) may also be configured in a different order, for example the VAD detector 1510 may operate on audio data 211 rather than on frequency domain framed audio data 1505, may operate on ASR features, etc. Various different configurations of components are possible. If there is no speech in the audio data, the NLP system 120 discards (1511) the frequency domain framed audio data 1505 (i.e., removes the audio data from the processing stream). If, instead, the NLP system 120 detects speech in the frequency domain framed audio data 1505, the NLP system 120 performs user recognition feature extraction (1508) on the frequency domain framed audio data 405. User recognition feature extraction (1508) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 1509). The feature extraction may continue until voice activity is no longer detected in the audio data, at which point the NLP system 120 may determine that an endpoint of the speech has been reached.

ASR feature extraction (1506) may be performed on all the audio data 211 received from the device 110. Alternatively (not illustrated), ASR feature extraction (1506) may only be performed on audio data including speech (as indicated by the VAD 1510). ASR feature extraction (1506) and/or user recognition feature extraction (1508) involve determining values (i.e., features) representing qualities of the frequency domain framed audio data 1505, along with quantitating those features into values (i.e., feature vectors or audio feature vectors). ASR feature extraction (1506) may determine ASR feature vector data 1507 useful for ASR processing, and user recognition feature extraction (1508) may determine user recognition feature vector data 1509 (sometimes called an i-vector) useful for user recognition. The ASR feature vector data 1507 and the user recognition feature vector data 1509 may be the same feature vectors, different feature vectors, or may include some overlapping feature vectors. A number of approaches may be used to extract feature vectors from the frequency domain framed audio data 1505, such as MFCCs, PLP techniques, neural network feature vector techniques, linear discriminant analysis, semi-tied covariance matrices, or other approaches known to those skilled in the art.

ASR feature vector data 1507 may include a different audio feature vector for each audio frame. Thus, for one 25 ms long audio frame, the ASR feature extraction component 1506 may output a single ASR feature vector. The ASR feature vectors 1507 output by the ASR feature extraction component 1506 may be output to the ASR component 250.

Depending on system configuration, the user recognition feature extraction component 1508 may output multiple user recognition feature vectors, for example one such vector for each audio frame. Alternatively, the user recognition feature extraction component 1508 may continue to input the frequency domain framed audio data 1505 while the utterance is ongoing (e.g., before the endpoint of the speech is reached in the audio data 1505). While the audio data 1505 for the utterance is input, the user recognition feature extraction component 1508 may accumulate or otherwise combine the audio data 1505 as it comes in. That is, for a certain frame's worth of audio data 1505 that comes in, the user recognition feature extraction component 1508 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 1508 may depend on what audio qualities are determined to be important for ultimate user recognition. Thus, the user recognition feature extraction component 1508 may be trained to isolate and process data that is most useful for user recognition. The output of the user recognition feature extraction component 1508 may thus include user recognition feature vector data 1509 that includes values for features useful for user recognition. The resulting user recognition feature vector data 1509 may then be used for user recognition.

Figure 16:
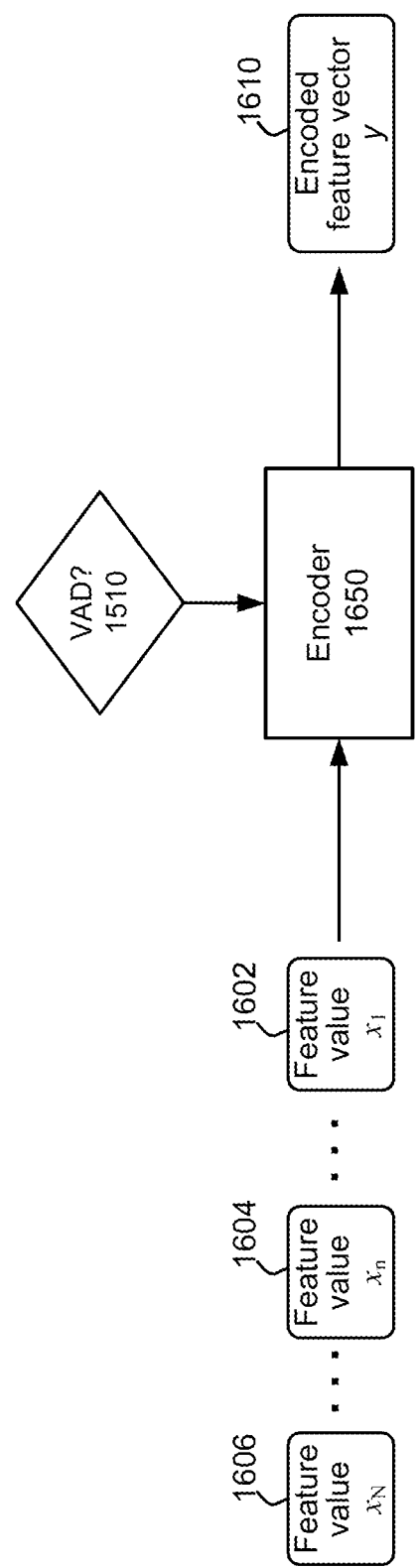
FIG. 16 is a diagram of a vector encoder, in accordance with embodiments of the present disclosure.

The user recognition feature vector data 1509 may include multiple vectors, each corresponding to different portions of the utterance. Alternatively, the user recognition feature vector data 1509 may be a single vector representing audio qualities of the utterance. Referring to FIG. 16, the single vector may be created using an encoder 1650 that can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As shown in FIG. 16, feature values 1602, 1604, and 1606 (which may include feature vectors of audio data 211, frequency domain framed audio data 1505, or the like) may be input into an encoder 1650 that will output an encoded feature vector 1610 that represents the input feature values. The VAD 1510 may be an input into the encoder 1650 such that the encoder 1650 may only operate when feature values input therein correspond to speech. The individual feature values (e.g., 1602, 1604, and 1606) may correspond to specific audio frames. Regardless of how many feature values are input, any particular encoder 1650 will be configured to output vectors of the same size, thus ensuring a continuity of output encoded vector size from any particular encoder 1650 (though different encoders may output vectors of different fixed sizes) and enabling comparison of different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 1650 may be implemented as a neural network (NN), recurrent neural network (RNN), GMM, or other model. One particular example is a long short-term memory (LSTM) RNN. There are a variety of ways for the encoder 1650 to consume the encoder input, including but not limited to:

linear, one direction (forward or backward),
    bi-linear, essentially the concatenation of a forward and a backward embedding, or
    tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 16 illustrates operation of the encoder 1650. The input feature value sequence, starting with feature value $x_1$ 1602, continuing through feature value $x_n$ 1604, and concluding with feature value $x_N$ 1606 is input into the encoder 1650. The encoder 1650 may process the input feature values as noted above. The encoder 1650 outputs the encoded feature vector y 1610, which is a fixed length feature vector of length F. Thus, the user recognition feature extraction component 1608 may include an encoder 1650 that receives audio feature values for a particular utterance as input, and outputs a fixed length encoded feature vector y 1610, which may be the user recognition feature vector data 1509. Thus, in certain system configurations, no matter how long the utterance is, or how many acoustic frames worth of feature values are input into the encoder 1650, the output feature vector 1610/1509 will be of the same length, thus allowing for more ease of performing user recognition by the user recognition component 295. To allow for robust system operation, a final vector 1610/1509 may include many dimensions (e.g., several hundred), thus providing many datapoints for downstream consideration.

To determine the user recognition feature vector data 1509, the system may (for example using the VAD detector 1510) determine that voice activity is detected in input audio. This may indicate the beginning of the utterance, thus resulting in the system determining that the input utterance starts at a first point in audio data. Audio processing (for example by windowing 1502, FFT 1504, ASR feature extraction 1506, user recognition feature extraction 1508, ASR processing, or the like) may continue on the utterance audio data starting at the first point and continuing until the VAD detector 1510 determines that voice activity is no longer detected at a second point in audio data. Thus, the system may determine that the input utterance ends at the second point. Thus, the first point may be considered the beginpoint of the utterance and the second point may be considered the endpoint of the utterance. The VAD detector 1510, or other component, may signal the user recognition feature extraction component 1508 when the beginpoint and/or endpoint is detected so that the user recognition feature extraction component 1508 may begin processing audio data starting at the beginpoint and ending at the endpoint. Further, audio frames during the utterance that do not include speech may be filtered out by the VAD detector 1510 and thus not considered by the ASR feature extraction component 1506 and/or user recognition feature extraction component 1508. The resulting accumulated/processed speech audio data for the utterance (from beginpoint to endpoint) may then be represented in a single feature vector for the user recognition feature vector data 1509, which may then be used for user recognition.

Figure 17:
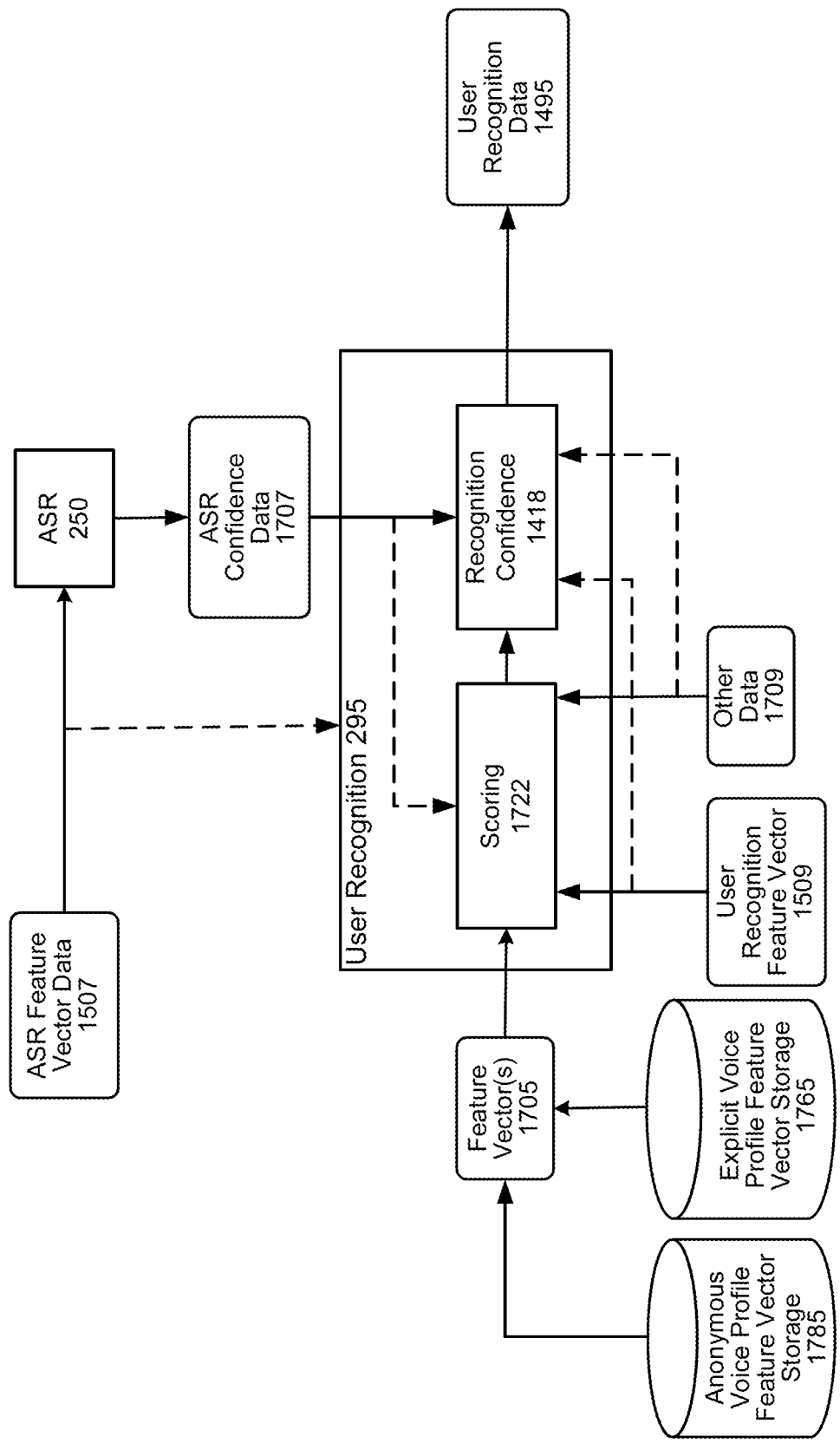
FIG. 17 is a system flow diagram illustrating user recognition processing, in accordance with embodiments of the present disclosure.

FIG. 17 illustrates user recognition as performed by the user recognition component 295. The ASR component 250 performs ASR on the ASR feature vector data 1507 as described above. ASR confidence data 1707 is passed to the user recognition component 295.

The user recognition component 295 performs user recognition using various data including the user recognition feature vector data 1509, feature vectors 1705 representing explicit and/or anonymous voice profiles, the ASR confidence data 1707, and other data 1709. The user recognition component 295 may then output user recognition confidence data 1495, which reflects a certain confidence that the user input was spoken by one or more particular users. The user recognition confidence data 1495 may include one or more user identifiers, one or more user profile identifiers, one or more explicit voice profile identifiers, and/or one or more anonymous voice profile identifiers. Each identifier in the user recognition confidence data 1495 may be associated with a respective confidence value, representing a likelihood that the user input corresponds to the identifier. A confidence value may be a numeric or binned value.

A system may be configured to identify a user based on the user explicitly enrolling in the system's user recognition functionality. For example, a user may initiate an enrollment process in which the user speaks utterances requested by the system, such as repeating a wakeword a number of times, reading a series of short phrases, or repeating a series of words as requested by the system. The system may generate audio data from the speech and generate a voice profile representing the user's speech in the audio data. The system may associate the voice profile with a user identifier of a known user. A known user is a user that has voluntarily provided the system with various additional personally-identifiable information (e.g., a name, user name, email address, phone number, etc.). A voice profile associated with a known user identifier may be referred to herein as an explicit voice profile.

A user may provide a system with permission to generate voice profiles for one or more users that interact with a device or group of devices (e.g., devices associated with a particular household). After receiving such permission and when a user input is received by the device(s), the system may determine speech characteristics representing the user input. The system may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system perform different actions), the different inputs of the user may have similar or identical speech characteristics (e.g., pitch, tone, etc.). Thus, when the system generates a voice profile by clustering the user inputs having the same or similar speech characteristics, the system is effectively generating a voice profile specific to a user even though the system does not know which user provided the inputs. This type of voice profile may be referred to as an anonymous voice profile.

The feature vector(s) 1705 input to the user recognition component 295 may correspond to one or more anonymous voice profiles (stored in anonymous voice profile feature vector storage 1785) and/or one or more explicit voice profiles (stored in explicit voice profile feature vector storage 1765). The user recognition component 295 may compare the feature vector(s) 1705 against the user recognition feature vector 1509, representing the present user input, to determine whether the user recognition feature vector 1509 corresponds to one or more of the feature vectors 1705 of the anonymous and/or explicit voice profiles.

Each feature vector 1705 may be the same size as the user recognition feature vector 1509. Thus, for example, if the user recognition feature vector 1509 is of size F (for example encoded by the encoder 1650), a feature vector 1705 may also be of size F.

To perform user recognition, the user recognition component 295 may determine the device 110 from which the audio data 211 originated. For example, the audio data 211 may be associated with metadata including a device identifier representing the device 110. Either the device 110 or the NLP system 120 may generate the metadata. The NLP system 120 may determine a group profile identifier associated with the device identifier, may determine user profile identifiers associated with the group profile identifier, and may include the group profile identifier and/or the user profile identifiers in the metadata. The NLP system 120 may associate the metadata with the user recognition feature vector 1509 produced from the audio data 211. The user recognition component 295 may send query the anonymous voice profile feature vector storage 1785 and/or the explicit voice profile feature vector storage 1765 for feature vectors 1705 associated with the device identifier, the group profile identifier, and/or the user profile identifiers represented in the metadata. This limits the universe of possible feature vectors 1705 the user recognition component 295 considers at runtime and thus decreases the amount of time to perform user recognition by decreasing the amount of feature vectors 1705 needed to be processed. Alternatively, the user recognition component 295 may access all (or some other subset of) feature vectors 1705 available to the user recognition component 295. However, accessing all feature vectors 1705 will likely increase the amount of time needed to perform user recognition based on the magnitude of feature vectors to be processed.

The user recognition component may attempt to identify the user that spoke the speech represented in the audio data 211 by comparing the user recognition feature vector 1509 to the received feature vector(s) 1705. The user recognition component 295 may include a scoring component 1722 that determines respective scores indicating whether the user input (represented by the user recognition feature vector 1509) was spoken by one or more particular users (represented by the feature vector(s) 1705). The user recognition component 295 may also include a confidence component 1418 that determines an overall accuracy of user recognition operations (such as those of the scoring component 1722) and/or an individual confidence value with respect to each user potentially identified by the scoring component 1722. The output from the scoring component 1722 may include a different confidence value for each received feature vector 1705. For example, the output may include a first confidence value for a first feature vector (representing a first anonymous or explicit voice profile), a second confidence value for a second feature vector (representing a second anonymous or explicit voice profile), etc. Although illustrated as two separate components, the scoring component 1722 and confidence component 1418 may be combined into a single component or may be separated into more than two components.

The scoring component 1722 and confidence component 1418 may implement one or more trained machine learning models (such neural networks, classifiers, etc.) as known in the art. For example, the scoring component 1722 may use probabilistic linear discriminant analysis (PLDA) techniques. PLDA scoring determines how likely it is that the user recognition feature vector 1509 corresponds to a particular feature vector 1705. The PLDA scoring may generate a confidence value for each feature vector 1705 considered and may output a list of confidence values associated with respective user profile identifiers, anonymous voice profile identifiers, and/or explicit voice profile identifiers. The scoring component 1722 may also use other techniques, such as GMMs, generative Bayesian models, or the like, to determine confidence values.

The confidence component 1418 may input various data including information about the ASR confidence 1707, speech length (e.g., number of frames or time of the user input), audio condition/quality data (such as signal-to-interference data or other metric data), fingerprint data, image data, or other factors to consider how confident the user recognition component 295 is with regard to the confidence values linking users to the user input. The confidence component 1418 may also consider the confidence values and associated identifiers output by the scoring component 1722. Thus, the confidence component 1418 may determine that a lower ASR confidence 1707, or poor audio quality, or other factors, may result in a lower confidence of the user recognition component 295. Whereas a higher ASR confidence 1707, or better audio quality, or other factors, may result in a higher confidence of the user recognition component 295. Precise determination of the confidence may depend on configuration and training of the confidence component 1418 and the models implemented thereby. The confidence component 1418 may operate using a number of different machine learning models/techniques such as GMM, neural networks, etc. For example, the confidence component 1418 may be a classifier configured to map a score output by the scoring component 1722 to a confidence value.

The user recognition component 295 may output user recognition confidence data 1495 specific to a single user profile identifier, anonymous voice profile identifier, or explicit voice profile identifier (or one or more user profile identifiers, one or more anonymous voice profile identifiers, and/or one or more explicit voice profile identifiers in the form of an N-best list). For example, the user recognition component 295 may output user recognition confidence data 1495 with respect to each received feature vector 1705. The user recognition confidence data 1495 may include numeric confidence values (e.g., 0.0-1.0, 0-1000, or whatever scale the system is configured to operate). Thus, the user recognition confidence data 1495 may output an N-best list of potential users with numeric confidence values (e.g., user profile identifier 123—0.2, anonymous voice profile identifier 234—0.8). Alternatively or additionally, the user recognition confidence data 1495 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the user recognition component 295 may output an N-best list of potential users with binned confidence value (e.g., user profile identifier 123—low, anonymous voice profile identifier 234—high). Combined binned and numeric confidence value outputs are also possible. Rather than a list of identifiers and their respective confidence values, the user recognition confidence data 1495 may only include information related to the top scoring identifier as determined by the user recognition component 295. The user recognition component 295 may also output an overall confidence value that the individual confidence values are correct, where the overall confidence value indicates how confident the user recognition component 295 is in the output results. The overall confidence value may be determined by the confidence component 1418.

The confidence component 1418 may determine differences between individual confidence values when determining the user recognition confidence data 1495. For example, if a difference between a first confidence value and a second confidence value is large (and, optionally) the first confidence value is above a threshold confidence value), then the user recognition component 295 is able to recognize a first user (associated with the feature vector 1705 associated with the first confidence value) as the user that spoke the user input with a much higher confidence than if the difference between the confidence values were smaller.

The user recognition component 295 may perform thresholding to avoid incorrect user recognition results being output. For example, the user recognition component 295 may compare a confidence value output by the confidence component 1418 to a threshold confidence value. If the confidence value does not satisfy (e.g., does not meet or exceed) the threshold confidence, the user recognition component 295 may not output user recognition confidence data 1495, or may only include in that data 1495 an indication that a user speaking the user input could not be recognized. Further, the user recognition component 295 may not output user recognition confidence data 1495 until enough user recognition feature vector data 1509 is accumulated and processed to verify a user above a threshold confidence. Thus, the user recognition component 295 may wait until a sufficient threshold quantity of audio data of the user input has been processed before outputting user recognition data 1495. The quantity of received audio data may also be considered by the confidence component 1418.

The user recognition component 295 may be defaulted to output binned (e.g., low, medium, high) user recognition confidence values. However, such may be problematic in certain situations. For example, if the user recognition component 295 computes a single binned confidence value for multiple feature vectors 1705, the system may not be able to effectively determine which user originated the user input. In this situation, the user recognition component 295 may be configured to override its default setting and output numeric confidence values. This enables the system to determine a user associated with the highest numeric confidence value originated the user input.

The user recognition component may use other data 1709 to inform user recognition processing. Thus, a trained model or other component of the user recognition component 295 may be trained to take other data 1709 as an input feature when performing user recognition. The other data 1709 may include a wide variety of data types depending on system configuration and may be made available from other sensors, devices, or storage. The other data 1709 may include a time of day at which the audio data 211 was generated by the device 110 or received from the device 110, a day of a week in which the audio data 211 was generated by the device 110 or received from the device 110, etc.

The other data 1709 may include image data and/or video data. For example, facial recognition may be performed on image data and/or video data received from the device 110 from which the audio data 211 was received (or another device). Facial recognition may be performed by the user recognition component 295, or another component of the NLP system 120. The output of facial recognition processing may be used by the user recognition component 295. That is, facial recognition output data may be used in conjunction with the comparison of the user recognition feature vector 1509 and one or more feature vectors 1705 to perform more accurate user recognition.

The other data 1709 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1709 may include data indicating a type of the device 110. Different types of devices may include, for example, a smart watch, a smart phone, a tablet computer, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 1709 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 211 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 110. The global coordinates and associated locations may be associated with one or more respective users.

The other data 1709 may include additional data representing activity of a particular user that may be useful in performing user recognition. For example, if a user has recently entered a code to disable a home security alarm, and the audio data 211 was received from a device 110 represented in a group profile associated with the home, signals from the home security alarm about the disabling user, time of disabling, etc. may be reflected in the other data 1709 and considered by the user recognition component 295. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 1709 and considered by the user recognition component 295.

Depending on system configuration, the other data 1709 may be configured to be included in the user recognition feature vector data 1509 (for example using the encoder 1650) so that all the data relating to the user input to be processed by the scoring component 1722 may be included in a single feature vector. Alternatively, the other data 1709 may be reflected in one or more different data structures to be processed by the scoring component 1722.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The user recognition component 295 may use one or more different types of user recognition processing (e.g., as described with respect to FIG. 14) depending on the data available to the user recognition component 295 and/or a recognition condition (e.g., threshold recognition confidence level) that needs to be satisfied. In some examples, simply performing one type of user recognition processing may be sufficient. In other examples, two or more different types of user recognition processing may be necessary to recognition the user to a degree satisfying the recognition condition.

Figure 18:
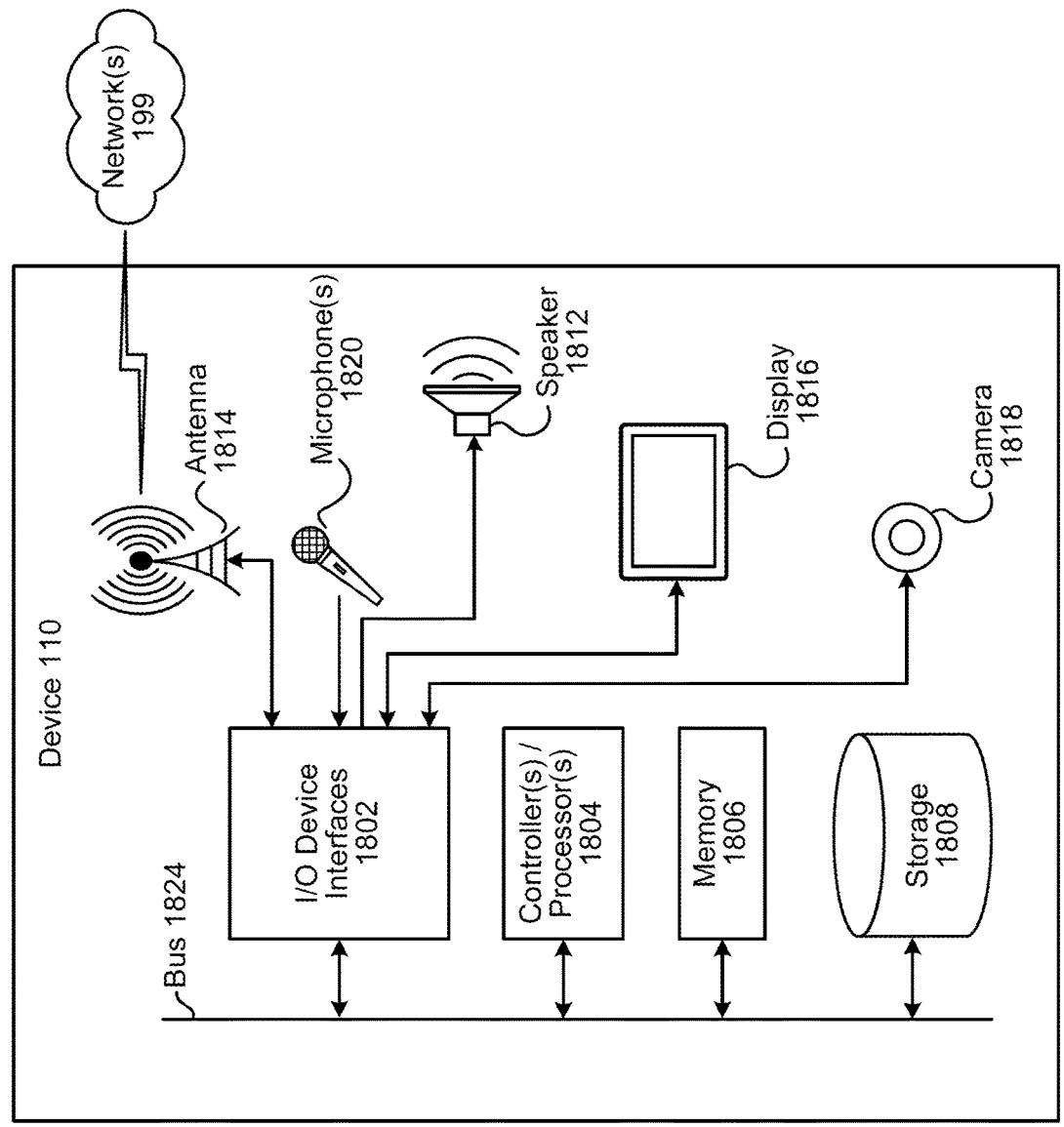
FIG. 18 is a block diagram conceptually illustrating example components of a device, in accordance with embodiments of the present disclosure.
Figure 19:
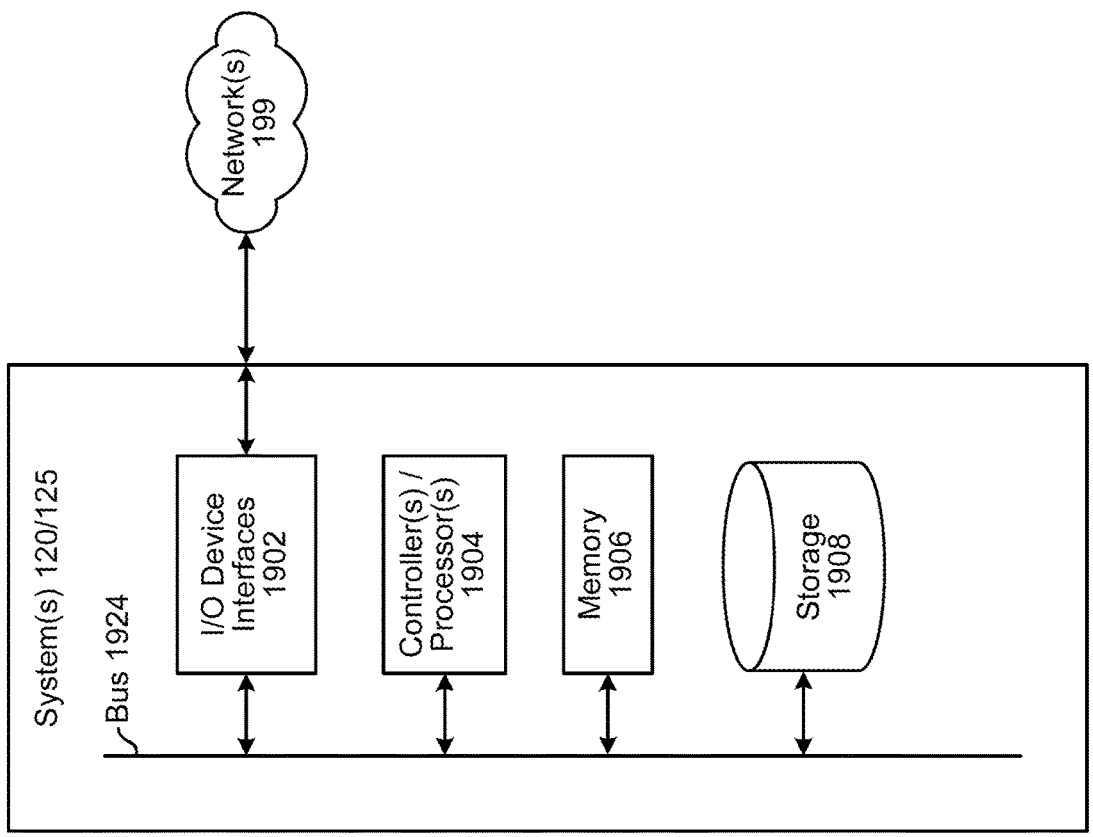
FIG. 19 is a block diagram conceptually illustrating example components of a system, in accordance with embodiments of the present disclosure.

FIG. 18 is a block diagram conceptually illustrating a device 110 that may be used with the system. FIG. 19 is a block diagram conceptually illustrating example components of a remote device, such as the natural language processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1804/1904), which may each include a central processing unit (CPU) for processing data and computer-readable instructions, and a memory (1806/1906) for storing data and instructions of the respective device. The memories (1806/1906) may individually include volatile random access memory (RAM), non-volatile read only memory (ROM), non-volatile magnetoresistive memory (MRAM), and/or other types of memory. Each device (110/120/125) may also include a data storage component (1808/1908) for storing data and controller/processor-executable instructions. Each data storage component (1808/1908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1802/1902).

Computer instructions for operating each device (110/120/125) and its various components may be executed by the respective device's controller(s)/processor(s) (1804/1904), using the memory (1806/1906) as temporary "working" storage at runtime. A device's computer instructions may be stored in a non-transitory manner in non-volatile memory (1806/1906), storage (1808/1908), or an external device(s). Alternatively, some or all of the executable instructions may be embedded in hardware or firmware on the respective device in addition to or instead of software.

Each device (110/120/125) includes input/output device interfaces (1802/1902). A variety of components may be connected through the input/output device interfaces (1802/1902), as will be discussed further below. Additionally, each device (110/120/125) may include an address/data bus (1824/1924) for conveying data among components of the respective device. Each component within a device (110/120/125) may also be directly connected to other components in addition to (or instead of) being connected to other components across the bus (1824/1924).

Referring to FIG. 18, the device 110 may include input/output device interfaces 1802 that connect to a variety of components such as an audio output component such as a speaker 1812, a wired headset or a wireless headset (not illustrated), or other component capable of outputting audio. The device 110 may also include an audio capture component. The audio capture component may be, for example, a microphone 1820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1816 for displaying content. The device 110 may further include a camera 1818.

Via antenna(s) 1814, the input/output device interfaces 1802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1802/1902) may also include communication components that allow data to be exchanged between devices such as different physical servers in a collection of servers or other components.

The components of the device(s) 110, the natural language processing system 120, or a skill system 125 may include their own dedicated processors, memory, and/or storage. Alternatively, one or more of the components of the device(s) 110, the natural language processing system 120, or a skill system 125 may utilize the I/O interfaces (1802/1902), processor(s) (1804/1904), memory (1806/1906), and/or storage (1808/1908) of the device(s) 110, natural language processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 125, as described herein, are illustrative, and may be located as a stand-alone device or may be included, in whole or in part, as a component of a larger device or system.

Figure 20:
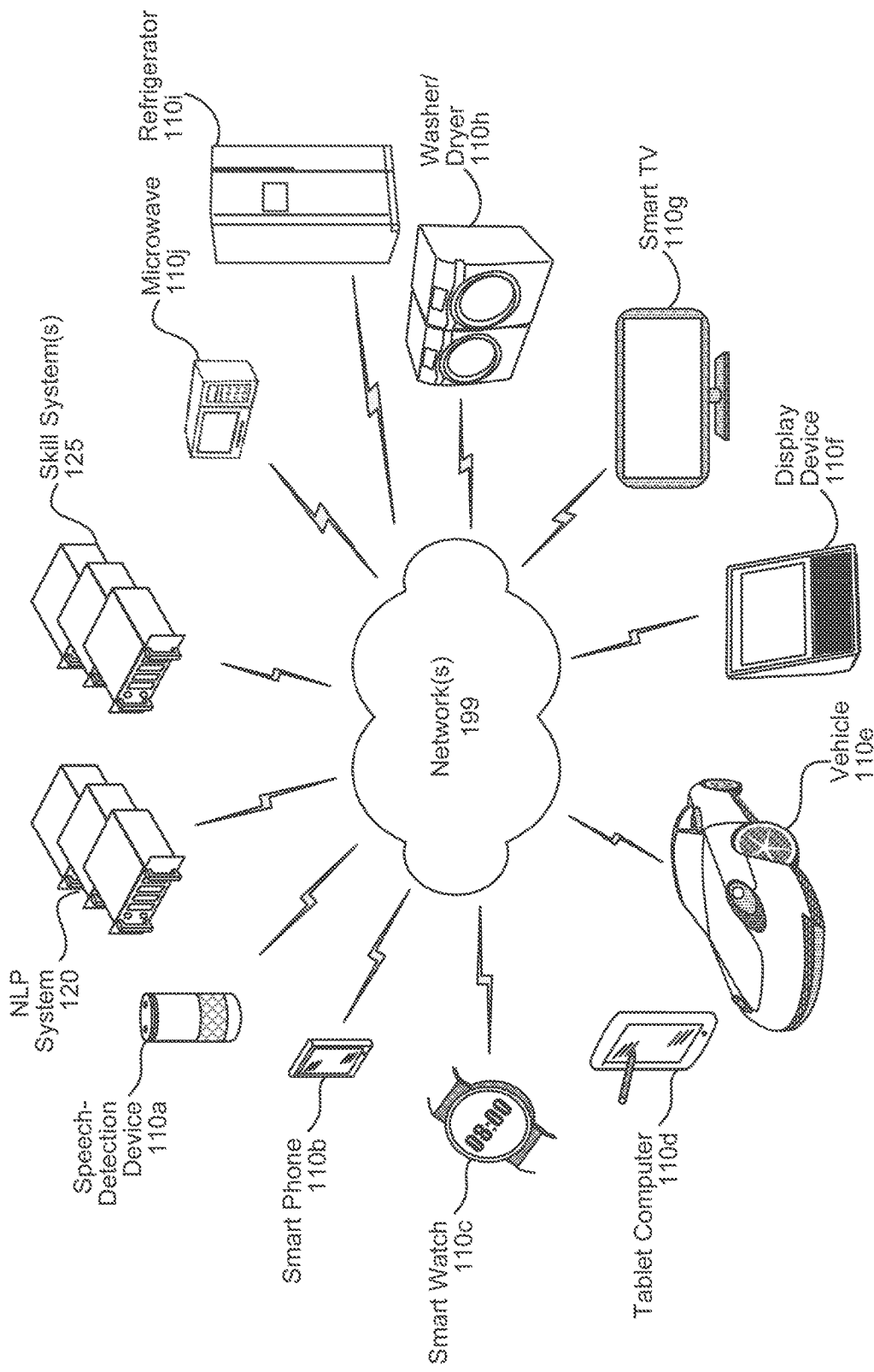
FIG. 20 illustrates an example of a computer network for use with the overall system, in accordance with embodiments of the present disclosure.

As illustrated in FIG. 20, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, by a component corresponding to at least a first virtual assistant and a second virtual assistant, first input data representing a first natural language input provided to a first device;
    receiving a device identifier corresponding to the first device;
    determining, using the device identifier, that the first virtual assistant is, for the first device, preferred to the second virtual assistant;
    based at least in part on the first virtual assistant being preferred, processing the first input data using first data corresponding to the first virtual assistant to determine response data responsive to the first natural language input;
    generating output data by performing speech synthesis processing using the response data and second data representing a synthetic voice corresponding to the first virtual assistant, wherein the output data comprises output audio data representing synthetic speech in the synthetic voice; and
    causing presentation of the output data.

2. The computer-implemented method of claim 1, wherein:
    receiving the first input data comprises receiving first input audio data representing an utterance of the first natural language input, wherein the utterance was captured by at least one microphone of the first device; and
    performing speech processing using the first input audio data.

3. The computer-implemented method of claim 2, wherein the utterance comprises a wakeword associated with the first virtual assistant.

4. The computer-implemented method of claim 2, wherein performing the speech processing comprises operating a speech processing component associated with the first virtual assistant.

5. The computer-implemented method of claim 1, further comprising:
    including, in the output data, an identifier corresponding to the first virtual assistant.

6. The computer-implemented method of claim 1, further comprising:
    processing the device identifier to determine a profile associated with the first device; and
    determining the profile is associated with the first virtual assistant.

7. The computer-implemented method of claim 1, further comprising:
    processing the device identifier to determine a device type of the first device; and
    determining the device type is associated with the first virtual assistant.

8. A system comprising:
    at least one processor; and
    at least one memory comprising instructions that, when executed by the at least one processor, cause the system to:
        receive, by a component corresponding to at least a first virtual assistant and a second virtual assistant, first input data representing a first natural language input provided to a first device;
        receive a device identifier corresponding to the first device;
        determining, using the device identifier, that the first virtual assistant is, for the first device, preferred to the second virtual assistant;
        based at least in part on the first virtual assistant being preferred, process the first input data using first data corresponding to the first virtual assistant to determine response data responsive to the first natural language input;
        based at least in part on the first virtual assistant being preferred, generate output data by performing speech synthesis processing using the response data and second data representing a synthetic voice corresponding to the first virtual assistant, wherein the output data comprises output audio data representing synthetic speech in the synthetic voice; and
        cause presentation of the output data.

9. The system of claim 8, wherein:
    the instructions that cause the system to receive the first input data comprise instructions that, when executed by the at least one processor, cause the system to receive first input audio data representing an utterance of the first natural language input, wherein the utterance was captured by at least one microphone of the first device; and
    the at least one memory further comprises instructions that, when executed by the at least one processor, further cause the system to perform speech processing using the first input audio data.

10. The system of claim 9, wherein the utterance comprises a wakeword associated with the first virtual assistant.

11. The system of claim 9, wherein the instructions that cause the system to perform the speech processing comprise instructions that, when executed by the at least one processor, cause the system to operate a speech processing component associated with the first virtual assistant.

12. The system of claim 8, wherein the at least one memory further comprises instructions that, when executed by the at least one processor, further cause the system to:
   include, in the output data, an identifier corresponding to the first virtual assistant.

13. The system of claim 8, wherein the at least one memory further comprises instructions that, when executed by the at least one processor, further cause the system to:
   process the device identifier to determine a profile associated with the first device; and
   determine the profile is associated with the first virtual assistant.

14. The system of claim 8, wherein the at least one memory further comprises instructions that, when executed by the at least one processor, further cause the system to:
   process the device identifier to determine a device type of the first device; and
   determine the device type is associated with the first virtual assistant.

* * * * *